US012726879B2

(12) United States Patent
Xu et al.

(10) Patent No.: US 12,726,879 B2
(45) Date of Patent: Sep. 1, 2026

(54) COMMUNICATION MODE SWITCHING METHOD AND RELATED APPARATUS

(71) Applicant: HUAWEI TECHNOLOGIES CO., LTD., Shenzhen (CN)

(72) Inventors: Shengfeng Xu, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/397,121

(22) Filed: Dec. 27, 2023

(65) Prior Publication Data

US 2024/0129830 A1 Apr. 18, 2024

Related U.S. Application Data

(63) Continuation of application No. PCT/CN2022/098825, filed on Jun. 15, 2022.

(30) Foreign Application Priority Data

Jul. 2, 2021 (CN) ......................... 202110753597.7

(51) Int. Cl.
*H04W 40/12* (2009.01)
*H04W 92/18* (2009.01)

(52) U.S. Cl.
CPC ............ *H04W 40/12* (2013.01); *H04W 92/18* (2013.01)

(58) Field of Classification Search
CPC . H04W 40/12; H04W 92/18; H04W 36/0011; H04W 36/033; H04W 36/144
See application file for complete search history.

(56) References Cited

U.S. PATENT DOCUMENTS

2019/0090173 A1 3/2019 Xiao et al.
2021/0345237 A1 11/2021 Ge et al.
2022/0095186 A1* 3/2022 Zhang .................. H04W 36/14

FOREIGN PATENT DOCUMENTS

CN 104303582 A 1/2015
CN 106961704 A 7/2017
(Continued)

OTHER PUBLICATIONS

Huawei, Hisilicon: "Summary of [93bis#24] [LTEV2V] Tx PC5 and Uu path switch for V2V", 3GPP Draft; R2-163815 Summary of 93BIS#24 LTEV2V Tx PC5 and UU Path Switch for V2V, 3rd Generation Partnership Project (3GPP), Mobile Competence Centre; 650, Route Des Lucioles; F-06921 Sophia-Antipolis Cedex; France, vol. RAN WG2, no. Nanjing, China; May 23, 2016-May 27, 2016, May 22, 2016 (May 22, 2016), XP051105221, total 22 pages.
(Continued)

*Primary Examiner* — Khoa Huynh
(74) *Attorney, Agent, or Firm* — HAUPTMAN HAM, LLP

(57) ABSTRACT

This application provides a communication mode switching method and a related apparatus. The method may include: A first terminal device sends a first message to a second terminal device, where the first message is used to request to switch at least one service between the first terminal device and the second terminal device from a PC5 interface communication mode to a Uu interface communication mode; and after receiving the first message of the first terminal device, the second terminal device sends a second message to the first terminal device, to notify that some or all of the at least one service are allowed to be switched from the PC5 interface communication mode to the Uu communication mode. According to the method, switching of one or more services from the PC5 interface communication mode to the
(Continued)

300

| First terminal device | | Second terminal device |
|---|---|---|
| | S301: First message, where the first message is used to request to switch at least one service between the first terminal device and the second terminal device from a PC5 interface communication mode to a Uu interface communication mode → | |
| | ← S302: Second message, where the second message is used to notify that switching of a first service from the PC5 interface communication mode to the Uu interface communication mode is accepted, and the at least one service includes the first service | |

Uu interface communication mode can be completed through negotiation between terminal devices.

19 Claims, 5 Drawing Sheets

(56) References Cited

FOREIGN PATENT DOCUMENTS

| | | | | | |
|---|---|---|---|---|---|
| CN | 111278169 | A | | 6/2020 | |
| CN | 111432457 | A | | 7/2020 | |
| CN | 109155905 | B | | 5/2021 | |
| CN | 112970288 | B | | 5/2022 | |
| GB | 2588096 | A | * | 4/2021 | .............. H04W 4/80 |
| WO | 2020030165 | A1 | | 2/2020 | |
| WO | WO-2021125691 | A1 | * | 6/2021 | .......... H04W 36/144 |

OTHER PUBLICATIONS

Australian Office Action issued in corresponding Australian Application No. 2022305545, dated Aug. 15, 2024, pp. 1-3.

SA WG2 Meeting #136,S2-1912400,Solution for path switch between PC5 and Uu,CATT,Huawei,HiSilicon,Nov. 18-22, 2019,XP051827103,total 4 pages.

LG Electronics et al.,3GPP TSG-SA WG2 Meeting #155,S2-2303393,Path switching between PC5 path and Uu path, Feb. 20-24, 2023,XP052249569,total 8 pages.

Search report dated Sep. 3, 2024 from corresponding application No. EP22831699.

3rd Generation Partnership Project;Technical Specification Group Services and System Aspects;Proximity based Services (ProSe) in the 5G System (5GS)(Release 17),3GPP TS 23.304 V1.0.0 (Jun. 2021),total:90pages.

* cited by examiner (a)

(b)

COMMUNICATION MODE SWITCHING METHOD AND RELATED APPARATUS

CROSS-REFERENCE TO RELATED APPLICATIONS

This application is a continuation of an International Application No. PCT/CN2022/098825, filed on Jun. 15, 2022, which claims priority to Chinese Patent Application No. 202110753597.7, filed on Jul. 2, 2021. The disclosures of the aforementioned applications are hereby incorporated by reference in their entireties.

TECHNICAL FIELD

This application relates to the communication field, and more specifically, to a communication mode switching method and a related apparatus.

BACKGROUND

User equipments (UEs) may communicate with each other in two communication modes. In one mode, communication is performed based on a proximity-based services communication 5 (PC5) interface. In other words, the UEs may directly communicate with each other, and the direct communication is not performed through an operator network (for example, a base station). This mode may be referred to as a PC5 interface communication mode. In the other mode, communication is performed based on a Uu interface. In other words, communication is performed through a mobile operator network. This mode may be referred to as a Uu interface communication mode.

In conventional technologies, when starting to transmit data of a service, the UEs determine a communication mode of the service based on a path selection policy obtained from a network side. For example, if the path selection policy represents that the service prefers the PC5 interface communication mode, the UEs communicate the data of the service in the PC5 interface communication mode.

It can be learned that, in the conventional technologies, the UEs communicate the data of the service in a fixed communication mode, and this cannot dynamically meet a communication requirement of the service, for example, a delay or quality.

SUMMARY

This application provides a communication mode switching method and a related apparatus, so that a service can be dynamically switched from a PC5 interface communication mode to a Uu interface communication mode.

According to a first aspect, a communication mode switching method is provided. The method may be performed by a terminal device, or may be performed by a component (for example, a chip or a circuit) of a terminal device. This is not limited herein. For ease of description, the following uses an example in which the method is performed by a first terminal device for description.

The method may include: The first terminal device sends a first message to a second terminal device, where the first message is used to request to switch at least one service between the first terminal device and the second terminal device from a proximity-based services communication 5 PC5 interface communication mode to a Uu interface communication mode; and the first terminal device receives a second message from the second terminal device, where the second message is used to notify that switching of a first service from the PC5 interface communication mode to the Uu interface communication mode is accepted, and the at least one service includes the first service.

In an example, the second message may be a response message of the first message.

Based on the technical solution, the first terminal device sends the first message to the second terminal device, to request to switch the at least one service between the first terminal device and the second terminal device from the PC5 interface communication mode to the Uu interface communication mode, and the second terminal device sends the second message to the first terminal device based on the first message, to notify that switching of the first service from the PC5 interface communication mode to the Uu interface communication mode is accepted. Through negotiation between the first terminal device and the second terminal device, one or more services can be switched from the PC5 interface communication mode to the Uu interface communication mode. In this way, it is avoided that data of the services is communicated in a fixed communication mode, and a communication requirement of the one or more services can be dynamically met. Further, compared with that another device (for example, a network device) indicates the first terminal device and the second terminal device to switch the one or more services from the PC5 interface communication mode to the Uu interface communication mode, the foregoing technical solution can reduce signaling overheads caused by the another device (for example, the network device) indicating the first terminal device and the second terminal device to switch the one or more services from the PC5 interface communication mode to the Uu interface communication mode. Further, compared with that the first terminal device separately switches the one or more services from the PC5 interface communication mode to the Uu interface communication mode, the foregoing technical solution avoids a case in which data of some services in the one or more services cannot be communicated between the first terminal device and the second terminal device in the Uu interface communication mode if the second terminal device does not accept (or does not agree or does not allow) switching of the some services from the PC5 interface communication mode to the Uu interface communication mode. Therefore, it can be ensured that after the one or more services are switched from the PC5 interface communication mode to the Uu interface communication mode, the one or more services can be communicated between the first terminal device and the second terminal device in the Uu interface communication mode.

With reference to the first aspect, in some implementations of the first aspect, the method further includes: The first terminal device switches the first service from the PC5 interface communication mode to the Uu interface communication mode based on the second message.

Based on the technical solution, the first terminal device switches a communication mode of the first service based on a response to the first message from the second terminal device.

With reference to the first aspect, in some implementations of the first aspect, the first message carries identification information of the at least one service, or the first message carries identification information of a PC5 quality of service QoS flow corresponding to the at least one service.

The PC5 QoS flow corresponding to the at least one service may be a QoS flow corresponding to data of the at least one service when the data of the at least one service is communicated in the PC5 interface communication mode.

Based on the technical solution, the identification information of the at least one service or the identification information of the PC5 QoS flow corresponding to the at least one service may be used by the second terminal device to learn of a service that the first terminal device requests to switch from the PC5 interface communication mode to the Uu interface communication mode.

With reference to the first aspect, in some implementations of the first aspect, the first message further carries first indication information, and the first indication information represents that the at least one service is switched from the PC5 interface communication mode to the Uu interface communication mode.

Based on the technical solution, the first message carries the first indication information, so that the second terminal device can learn that the first message is used to request to switch the at least one service from the PC5 interface communication mode to the Uu interface communication mode. For example, the first message is an existing message. To be specific, the first terminal device may negotiate with the second terminal device by adding the first indication information to the existing message, to switch the one or more services from the PC5 interface communication mode to the Uu interface communication mode.

With reference to the first aspect, in some implementations of the first aspect, that the first terminal device sends a first message to a second terminal device includes: The first terminal device sends the first message to the second terminal device based on first reference information, where the first reference information includes one or more of the following information: a path selection policy, a path switching policy, a QoS requirement of the PC5 QoS flow corresponding to the at least one service, and signal quality of transmitting the data of the at least one service by the first terminal device in the PC5 interface communication mode.

The PC5 QoS flow corresponding to the at least one service may be the QoS flow corresponding to the data of the at least one service when the data of the at least one service is communicated in the PC5 interface communication mode.

Based on the technical solution, the first terminal device determines, based on the first reference information, to switch the at least one service from the PC5 interface communication mode to the Uu interface communication mode. Therefore, the first terminal device sends the first message to the second terminal device.

With reference to the first aspect, in some implementations of the first aspect, that the first terminal device sends the first message to the second terminal device based on first reference information includes: When the QoS requirement of the PC5 QoS flow corresponding to the at least one service is not met, the first terminal device sends the first message to the second terminal device. Alternatively, when the signal quality of transmitting the data of the at least one service in the PC5 interface communication mode is less than a first signal quality threshold, the first terminal device sends the first message to the second terminal device. Alternatively, when the path selection policy includes information about a service for which the Uu interface communication mode is preferably used, and the service for which the Uu interface communication mode is preferably used includes the at least one service, the first terminal device sends the first message to the second terminal device. Alternatively, when the path switching policy includes information about a service for which switching of a communication mode is allowed, and the service for which switching of the communication mode is allowed includes the at least one service, if the QoS requirement of the PC5 QoS flow corresponding to the at least one service is not met, or the signal quality of transmitting the data of the at least one service in the PC5 interface communication mode is less than a first signal quality threshold, the first terminal device sends the first message to the second terminal device. Alternatively, when the path switching policy includes information about a service for which switching of a communication mode is prohibited, and the service for which switching of the communication mode is prohibited does not include the at least one service, if the QoS requirement of the PC5 QoS flow corresponding to the at least one service is not met, or the signal quality of transmitting the data of the at least one service in the PC5 interface communication mode is less than a first signal quality threshold, the first terminal device sends the first message to the second terminal device.

Based on the technical solution, the first terminal device may send the first message to the second terminal device based on the QoS requirement of the PC5 QoS flow corresponding to the at least one service being not met or the signal quality of transmitting the data of the at least one service in the PC5 interface communication mode being less than the first signal quality threshold, so that data communication performance can be ensured as much as possible. In addition, the first terminal device may alternatively send the first message to the second terminal device based on the path selection policy, so that the service that is switched from the PC5 interface communication mode to the Uu interface communication mode is the service for which the Uu interface communication mode is preferably used. In addition, the first terminal device may alternatively send the first message to the second terminal device based on the path selection policy, so that the service that is switched from the PC5 interface communication mode to the Uu interface communication mode is the service for which switching of the communication mode is allowed.

With reference to the first aspect, in some implementations of the first aspect, the method further includes: The first terminal device sends a first QoS parameter to the second terminal device, where the first QoS parameter is used by the first terminal device to transmit data of the first service in the Uu interface communication mode.

Based on the technical solution, the first terminal device sends the first QoS parameter to the second terminal device, so that the second terminal device determines a second QoS parameter based on the first QoS parameter, and the second terminal device may communicate the data of the first service in the Uu interface communication mode by using the second QoS parameter.

With reference to the first aspect, in some implementations of the first aspect, before the first terminal device sends the first QoS parameter to the second terminal device, the method further includes: The first terminal device determines the first QoS parameter based on a third QoS parameter, where the third QoS parameter is used by the first terminal device to transmit data of the first service in the PC5 interface communication mode.

Based on the technical solution, the first terminal device may determine the first QoS parameter based on the QoS parameter of transmitting the first service in the PC5 interface communication mode that is used before the communication mode is switched. For example, a rate in the first QoS parameter is greater than or equal to a rate in the QoS parameter of transmitting the first service in the PC5 interface communication mode that is used before the communication mode is switched. In this way, data communication performance of transmitting the data of the first service in the Uu interface communication mode can be improved.

With reference to the first aspect, in some implementations of the first aspect, the method further includes: The first terminal device receives a second QoS parameter from the second terminal device, where the second QoS parameter is used by the second terminal device to transmit data of the first service in the Uu interface communication mode; and the first terminal device determines the first QoS parameter based on the second QoS parameter, where the first QoS parameter is used by the first terminal device to transmit data of the first service in the Uu interface communication mode.

Based on the technical solution, after receiving the second QoS parameter from the second terminal device, the first terminal device may update the first QoS parameter based on the second QoS parameter, thereby improving quality of communication over a Uu interface between the first terminal device and the second terminal device.

With reference to the first aspect, in some implementations of the first aspect, the method further includes: The first terminal device sends a second QoS parameter to the second terminal device, where the second QoS parameter is used by the second terminal device to transmit data of the first service in the Uu interface communication mode.

Based on the technical solution, the first terminal device may recommend or suggest the second QoS parameter to the second terminal device, thereby reducing resource consumption caused by determining the second QoS parameter by the second terminal device.

With reference to the first aspect, in some implementations of the first aspect, the method further includes: The first terminal device determines the second QoS parameter based on a third QoS parameter, where the third QoS parameter is used by the first terminal device to transmit data of the first service in the PC5 interface communication mode.

With reference to the first aspect, in some implementations of the first aspect, the first message carries second indication information, and the second indication information represents that when the data of the at least one service is communicated in the Uu interface communication mode, an application server corresponding to the at least one service is not passed through.

With reference to the first aspect, in some implementations of the first aspect, after the first terminal device receives the second message from the second terminal device, the method further includes: The first terminal device sends third indication information to the second terminal device, where the third indication information represents that when the data of the first service is communicated in the Uu interface communication mode, an application server corresponding to the first service is not passed through.

With reference to the first aspect, in some implementations of the first aspect, the method further includes: The first terminal device sends address information of the first terminal device to the second terminal device, where the address information of the first terminal device is used to transmit data of the first service between the first terminal device and the second terminal device in the Uu interface communication mode.

Specifically, that the first terminal device sends address information of the first terminal device to the second terminal device may include: When the first terminal device determines that when the data of the first service is communicated in the Uu interface communication mode, the application server corresponding to the first service is not passed through, the first terminal device sends the address information of the first terminal device to the second terminal device.

With reference to the first aspect, in some implementations of the first aspect, the method further includes: The first terminal device receives address information of the second terminal device from the second terminal device, where the address information of the second terminal device is used to transmit data of the first service between the first terminal device and the second terminal device in the Uu interface communication mode.

With reference to the first aspect, in some implementations of the first aspect, the method further includes: The first terminal device establishes a Uu communication path, where the Uu communication path is used to transmit data of the first service in the Uu interface communication mode.

With reference to the first aspect, in some implementations of the first aspect, after the first terminal device receives the second message from the second terminal device, the method further includes: The first terminal device sends a third message to the second terminal device, where the third message is used to trigger the second terminal device to switch the first service from the PC5 interface communication mode to the Uu interface communication mode.

Based on the technical solution, the first terminal device may send, to the second terminal device, a message used to trigger switching of the first service from the PC5 interface communication mode to the Uu interface communication mode, so that the second terminal device switches the first service from the PC5 interface communication mode to the Uu interface communication mode.

According to a second aspect, a communication mode switching method is provided. The method may be performed by a terminal device, or may be performed by a component (for example, a chip or a circuit) of a terminal device. This is not limited in this application. For ease of description, the following uses an example in which the method is performed by a second terminal device for description.

The method may include: The second terminal device receives a first message from a first terminal device, where the first message is used to request to switch at least one service between the first terminal device and the second terminal device from a proximity-based services communication 5 PC5 interface communication mode to a Uu interface communication mode; and the second terminal device sends a second message to the first terminal device based on the first message, where the second message is used to notify that switching of a first service from the PC5 interface communication mode to the Uu interface communication mode is accepted, and the at least one service includes the first service.

Based on the technical solution, after receiving, from the first terminal device, the first message for requesting to switch the at least one service between the first terminal device and the second terminal device from the PC5 interface communication mode to the Uu interface communication mode, the second terminal device may send the second message to the first terminal device, to notify that switching of the first service from the PC5 interface communication mode to the Uu interface communication mode is accepted. In this manner, the terminal devices may complete, through negotiation, switching of one or more services from the PC5 interface communication mode to the Uu interface communication mode, to dynamically switch the one or more services from the PC5 interface communication mode to the Uu interface communication mode. In this way, it is avoided that data of the services is communicated in a fixed communication mode, and a communication requirement of the one or more services can be dynamically met. Further, compared with that another device (for example, a network device) indicates the first terminal device and the second terminal device to switch the one or more services from the PC5 interface communication mode to the Uu interface communication mode, the foregoing technical solution can reduce signaling overheads caused by the another device (for example, the network device) indicating the first terminal device and the second terminal device to switch the one or more services from the PC5 interface communication mode to the Uu interface communication mode. Further, compared with that the first terminal device separately switches the one or more services from the PC5 interface communication mode to the Uu interface communication mode, the foregoing technical solution avoids a case in which data of some services in the one or more services cannot be communicated between the first terminal device and the second terminal device in the Uu interface communication mode if the second terminal device does not accept (or does not agree or does not allow) switching of the some services from the PC5 interface communication mode to the Uu interface communication mode. Therefore, it can be ensured that after the one or more services are switched from the PC5 interface communication mode to the Uu interface communication mode, the one or more services can be communicated between the first terminal device and the second terminal device in the Uu interface communication mode.

With reference to the second aspect, in some implementations of the second aspect, the method further includes: The second terminal device determines, based on second reference information, to accept switching of the first service from the PC5 interface communication mode to the Uu interface communication mode, where the second reference information includes one or more of the following information: a path selection policy, a path switching policy, and signal quality of a Uu interface of the second terminal device.

Based on the technical solution, the second terminal device determines, based on the second reference information, to accept switching of the first service from the PC5 interface communication mode to the Uu interface communication mode. Therefore, the second terminal device sends the second message to the first terminal device.

With reference to the second aspect, in some implementations of the second aspect, that the second terminal device determines, based on second reference information, to accept switching of the first service from the PC5 interface communication mode to the Uu interface communication mode includes: When the path selection policy includes information about a service for which the Uu interface communication mode is preferably used, and the service for which the Uu interface communication mode is preferably used includes the first service, the second terminal device determines to accept switching of the first service from the PC5 interface communication mode to the Uu interface communication mode. Alternatively, when the path switching policy includes information about a service for which switching of a communication mode is allowed, and the service for which switching of the communication mode is allowed includes the first service, the second terminal device determines to accept switching of the first service from the PC5 interface communication mode to the Uu interface communication mode. Alternatively, when the path switching policy includes information about a service for which switching of a communication mode is prohibited, and the service for which switching of the communication mode is prohibited does not include the first service, the second terminal device determines to accept switching of the first service from the PC5 interface communication mode to the Uu interface communication mode. Alternatively, when the signal quality of the Uu interface of the second terminal device meets a quality of service QoS requirement of the first service, the second terminal device determines to accept switching of the first service from the PC5 interface communication mode to the Uu interface communication mode. Alternatively, when the signal quality of the Uu interface of the second terminal device is greater than or equal to a second signal quality threshold, the second terminal device determines to accept switching of the first service from the PC5 interface communication mode to the Uu interface communication mode. In this case, the first service may be the at least one service, or may be any one or more of the at least one service.

Based on the technical solution, the second terminal device may determine, based on the signal quality of the Uu interface of the second terminal device meeting the QoS requirement of the first service, to accept switching of the first service from the PC5 interface communication mode to the Uu interface communication mode. In this way, after the first service is switched from the PC5 interface communication mode to the Uu interface communication mode, the signal quality of the Uu interface of the second terminal device can meet the QoS requirement of the first service. In addition, the second terminal device may alternatively determine, based on the path selection policy, to accept switching of the first service from the PC5 interface communication mode to the Uu interface communication mode, so that the first service that is switched from the PC5 interface communication mode to the Uu interface communication mode is the service for which the Uu interface communication mode is preferably used. In addition, the second terminal device may alternatively determine, based on the path selection policy, to accept switching of the first service from the PC5 interface communication mode to the Uu interface communication mode, so that the service that is switched from the PC5 interface communication mode to the Uu interface communication mode is the service for which switching of the communication mode is allowed.

With reference to the second aspect, in some implementations of the second aspect, the first message carries identification information of the at least one service, or the first message carries identification information of a PC5 quality of service QoS flow corresponding to the at least one service.

The PC5 QoS flow corresponding to the at least one service may be a QoS flow corresponding to data of the at least one service when the data of the at least one service is communicated in the PC5 interface communication mode.

With reference to the second aspect, in some implementations of the second aspect, the first message carries first indication information, and the first indication information represents that the at least one service is switched from the PC5 interface communication mode to the Uu interface communication mode.

With reference to the second aspect, in some implementations of the second aspect, the second message carries identification information of the first service, or the second message carries identification information of a PC5 QoS flow corresponding to the first service.

The PC5 QoS flow corresponding to the first service may be a QoS flow corresponding to data of the first service when the data of the first service is communicated in the PC5 interface communication mode.

Based on the technical solution, the identification information of the at least one service or the identification information of the PC5 QoS flow corresponding to the at least one service may be used by the first terminal device to learn of a service of which switching from the PC5 interface communication mode to the Uu interface communication mode is accepted by the second terminal device.

With reference to the second aspect, in some implementations of the second aspect, the method further includes: The second terminal device sends a second QoS parameter to the first terminal device, where the second QoS parameter is used by the second terminal device to transmit data of the first service in the Uu interface communication mode.

Based on the technical solution, the second terminal device sends the second QoS parameter to the first terminal device, so that the first terminal device determines a first QoS parameter based on the second QoS parameter, and the first terminal device may communicate the data of the first service in the Uu interface communication mode by using the first QoS parameter.

With reference to the second aspect, in some implementations of the second aspect, before the second terminal device sends the second QoS parameter to the first terminal device, the method further includes: The second terminal device receives the first QoS parameter from the first terminal device, where the first QoS parameter is used by the first terminal device to transmit data of the first service in the Uu interface communication mode; and the second terminal device determines the second QoS parameter based on the first QoS parameter.

With reference to the second aspect, in some implementations of the second aspect, before the second terminal device sends the second QoS parameter to the first terminal device, the method further includes: The second terminal device determines the second QoS parameter based on a third QoS parameter, where the third QoS parameter is used by the second terminal device to transmit data of the first service in the PC5 interface communication mode.

Based on the technical solution, the second terminal device may determine the second QoS parameter based on the QoS parameter of transmitting the first service in the PC5 interface communication mode that is used before the communication mode is switched. For example, a rate in the second QoS parameter is greater than or equal to a rate in the QoS parameter of transmitting the first service in the PC5 interface communication mode that is used before the communication mode is switched. In this way, data communication performance of transmitting the data of the first service in the Uu interface communication mode can be improved.

With reference to the second aspect, in some implementations of the second aspect, the method further includes: The second terminal device receives a second QoS parameter from the first terminal device, where the second QoS parameter is used by the second terminal device to transmit data of the first service in the Uu interface communication mode.

With reference to the second aspect, in some implementations of the second aspect, the first message carries second indication information, and the second indication information represents that when the data of the at least one service is communicated in the Uu interface communication mode, an application server corresponding to the at least one service is not passed through. The method further includes: The second terminal device sends address information of the second terminal device to the first terminal device based on the second indication information, where the address information of the second terminal device is used to transmit data of the at least one service between the first terminal device and the second terminal device in the Uu interface communication mode.

With reference to the second aspect, in some implementations of the second aspect, after the second terminal device sends the second message to the first terminal device, the method further includes: The second terminal device receives third indication information from the first terminal device, where the third indication information represents that when the data of the first service is communicated in the Uu interface communication mode, an application server corresponding to the first service is not passed through; and the second terminal device sends address information of the second terminal device to the first terminal device based on the third indication information, where the address information of the second terminal device is used to transmit data of the first service between the first terminal device and the second terminal device in the Uu interface communication mode.

With reference to the second aspect, in some implementations of the second aspect, the method further includes: The second terminal device receives address information of the first terminal device from the first terminal device, where the address information of the first terminal device is used to transmit data of the first service between the first terminal device and the second terminal device in the Uu interface communication mode; and the second terminal device sends address information of the second terminal device to the first terminal device based on the address information of the first terminal device, where the address information of the second terminal device is used to transmit data of the first service between the first terminal device and the second terminal device in the Uu interface communication mode.

With reference to the second aspect, in some implementations of the second aspect, after the second terminal device sends the second message to the first terminal device, the method further includes: The second terminal device receives a third message from the first terminal device, where the third message is used to trigger the second terminal device to switch the first service from the PC5 interface communication mode to the Uu interface communication mode; and the second terminal device switches the first service from the PC5 interface communication mode to the Uu interface communication mode based on the third message.

According to a third aspect, a communication apparatus is provided. The apparatus is configured to perform the method provided in the first aspect or the second aspect. Specifically, the apparatus may include units and/or modules configured to perform the method provided in any one of the first aspect or the implementations of the first aspect or any one of the second aspect or the implementations of the second aspect, for example, a processing unit and/or a communication unit.

In an implementation, the apparatus is a terminal device. When the apparatus is a terminal device, the communication unit may be a transceiver or an input/output interface, and the processing unit may be at least one processor. Optionally, the transceiver may be a transceiver circuit. Optionally, the input/output interface may be an input/output circuit.

In another implementation, the apparatus is a chip, a chip system, or a circuit used in a terminal device. When the apparatus is a chip, a chip system, or a circuit used in a terminal device, the communication unit may be an input/output interface, an interface circuit, an output circuit, an input circuit, a pin, a related circuit, or the like on the chip, the chip system, or the circuit. The processing unit may be at least one processor, processing circuit, logic circuit, or the like.

According to a fourth aspect, a communication apparatus is provided. The apparatus includes: a memory, configured to store a program; and at least one processor, configured to execute a computer program or instructions stored in the memory, to perform the method provided in any one of the first aspect or the implementations of the first aspect or any one of the second aspect or the implementations of the second aspect.

In an implementation, the apparatus is a terminal device.

In another implementation, the apparatus is a chip, a chip system, or a circuit used in a terminal device.

According to a fifth aspect, this application provides a processor, configured to perform the method provided in each of the foregoing aspects.

Unless otherwise specified, or if operations such as sending and obtaining/receiving related to the processor do not conflict with actual functions or internal logic of the processor in related descriptions, the operations may be understood as operations such as output, receiving, and input of the processor, or may be understood as sending and receiving operations performed by a radio frequency circuit and an antenna. This is not limited in this application.

According to a sixth aspect, a computer-readable storage medium is provided. The computer-readable storage medium stores program code to be executed by a device, and the program code includes code used to perform the method provided in any one of the first aspect or the implementations of the first aspect or any one of the second aspect or the implementations of the second aspect.

According to a seventh aspect, a computer program product including instructions is provided. When the computer program product runs on a computer, the computer is enabled to perform the method provided in any one of the first aspect or the implementations of the first aspect or any one of the second aspect or the implementations of the second aspect.

According to an eighth aspect, a chip is provided. The chip includes a processor and a communication interface. The processor reads, through the communication interface, instructions stored in a memory, to perform the method provided in any one of the first aspect or the implementations of the first aspect or any one of the second aspect or the implementations of the second aspect.

Optionally, in an implementation, the chip further includes the memory. The memory stores a computer program or instructions, and the processor is configured to execute the computer program or the instructions stored in the memory. When the computer program or the instructions are executed, the processor is configured to perform the method provided in any one of the first aspect or the implementations of the first aspect or any one of the second aspect or the implementations of the second aspect.

According to a ninth aspect, a communication mode switching system is provided, where the system includes the first terminal device and the second terminal device described above.

Figure 2:
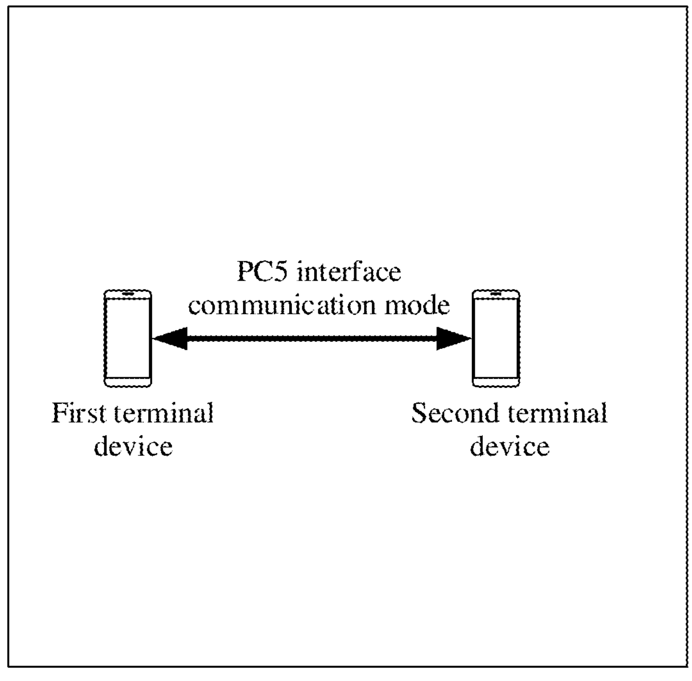
Figure 2:
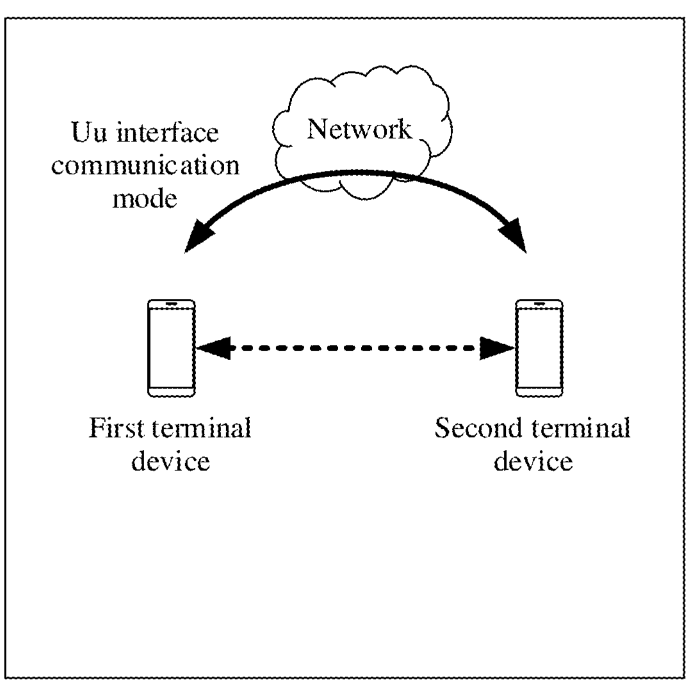
Figure 3:
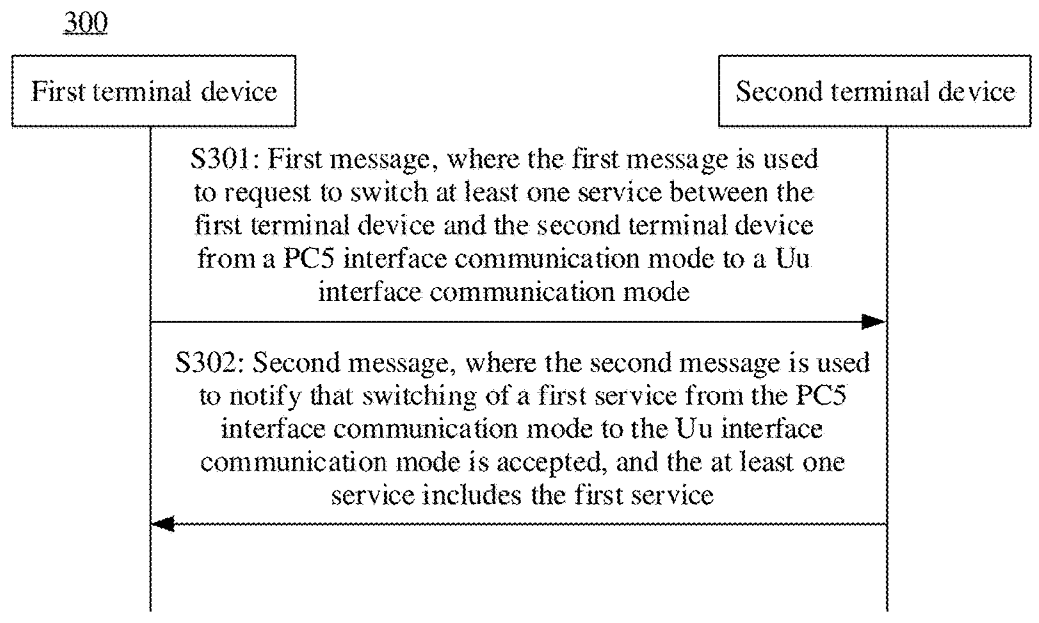
Figure 4:
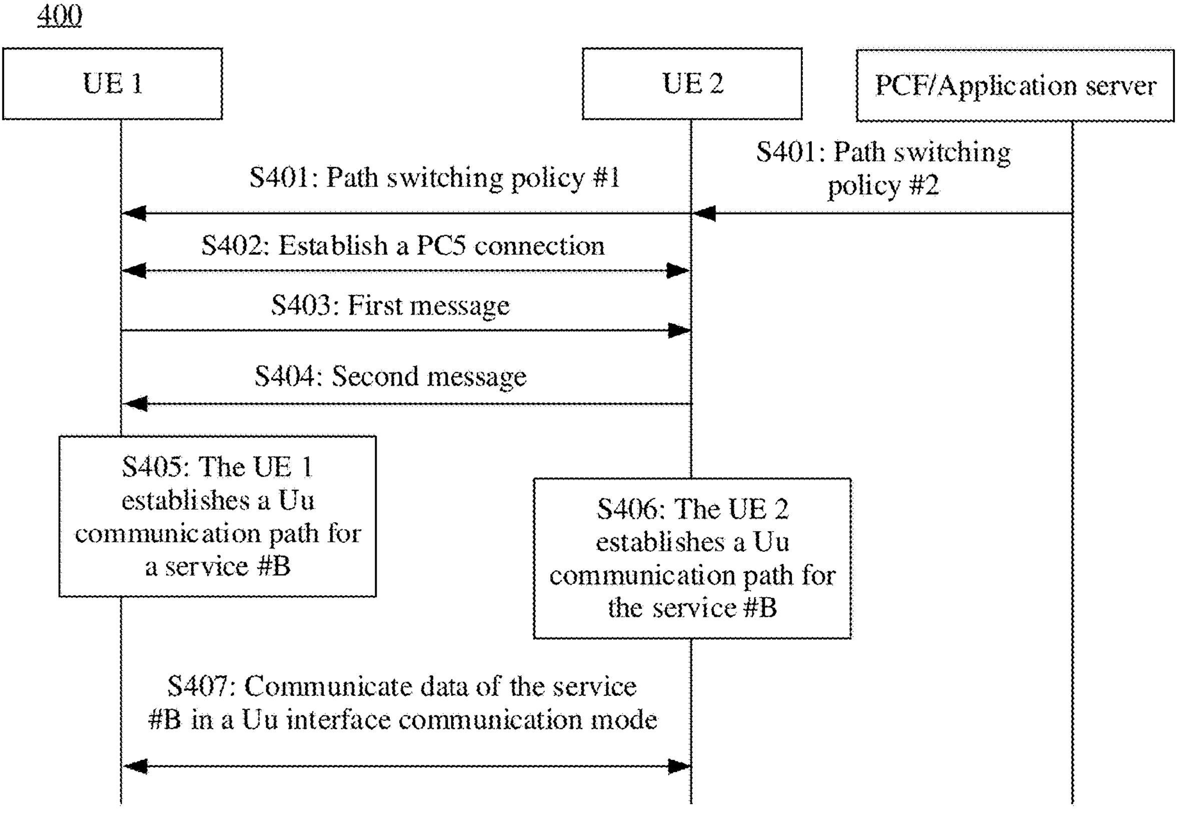
Figure 5:
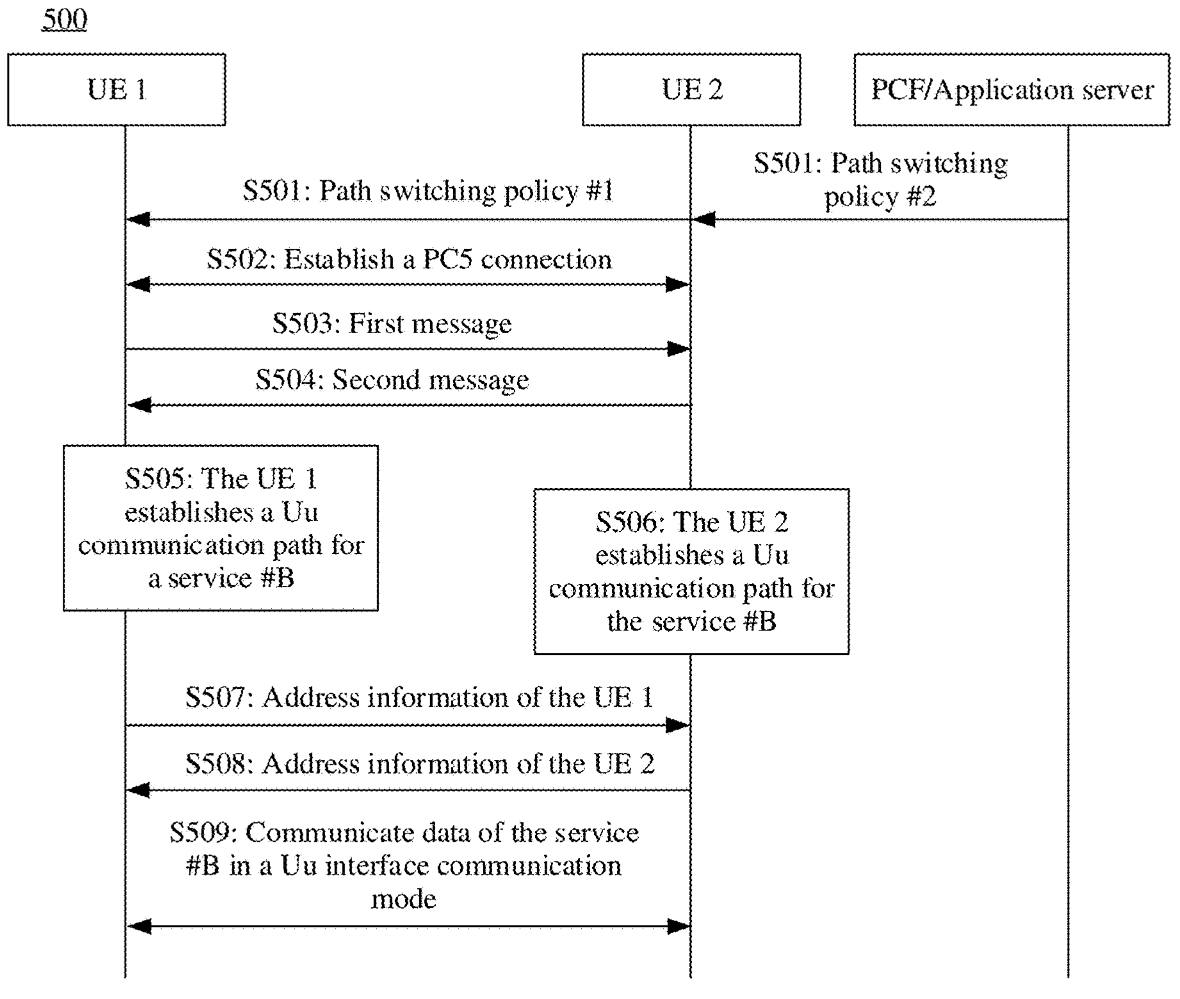
Figure 6:
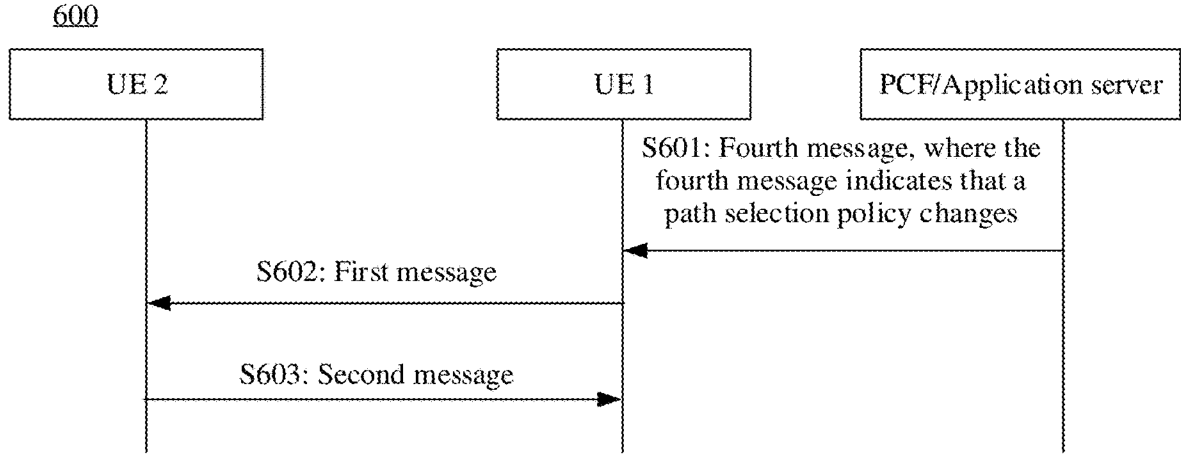
Figure 7:
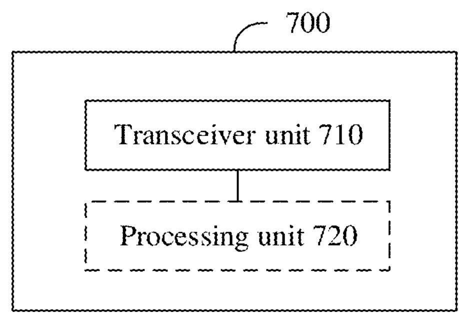
Figure 8:
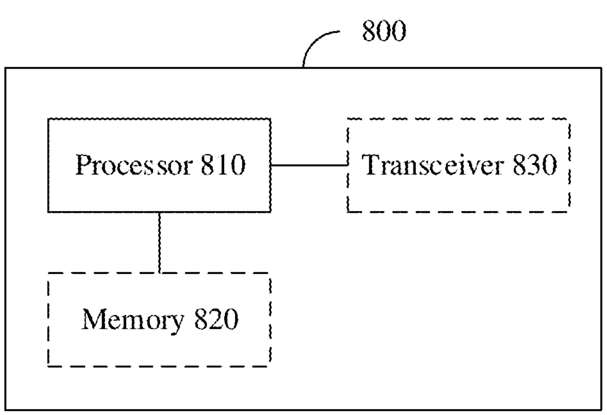
Figure 9:
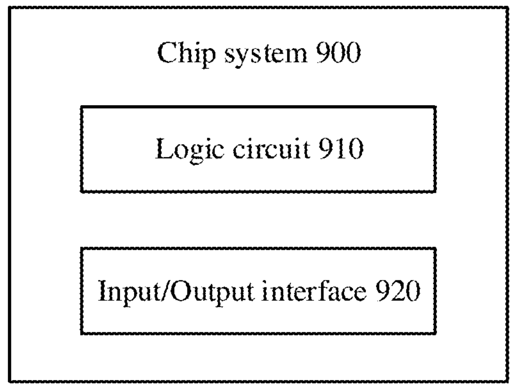

(a) in FIG. 2 is a schematic diagram of a PC5 interface communication mode;

(b) in FIG. 2 is a schematic diagram of a Uu interface communication mode;

FIG. 3 is a schematic diagram of a communication mode switching method 300 according to an embodiment of this application;

FIG. 4 is a schematic flowchart of a communication mode switching method 400 according to an embodiment of this application;

FIG. 5 is a schematic flowchart of another communication mode switching method 500 according to an embodiment of this application;

FIG. 6 is a schematic flowchart of still another communication mode switching method 600 according to an embodiment of this application;

FIG. 7 is a schematic block diagram of a communication mode switching apparatus 700 according to an embodiment of this application;

FIG. 8 is a schematic block diagram of another communication mode switching apparatus 800 according to an embodiment of this application; and FIG. 9 is a schematic diagram of a chip system 900 according to an embodiment of this application.

DESCRIPTION OF EMBODIMENTS

The following describes the technical solutions of this application with reference to accompanying drawings.

The technical solutions provided in this application may be applied to various communication systems, for example, a 5th generation (5G) or new radio (NR) system, a long term evolution (LTE) system, an LTE frequency division duplex (FDD) system, and an LTE time division duplex (TDD) system. The technical solutions provided in this application may be further applied to a future communication system, for example, a 6th generation mobile communication system. The technical solutions provided in this application may be further applied to a device-to-device (D2D) communication system, a vehicle-to-everything (V2X) communication system, a machine-to-machine (M2M) communication system, a machine type communication (MTC), system, an Internet of things (IoT) communication system, or another communication system.

Figure 1:
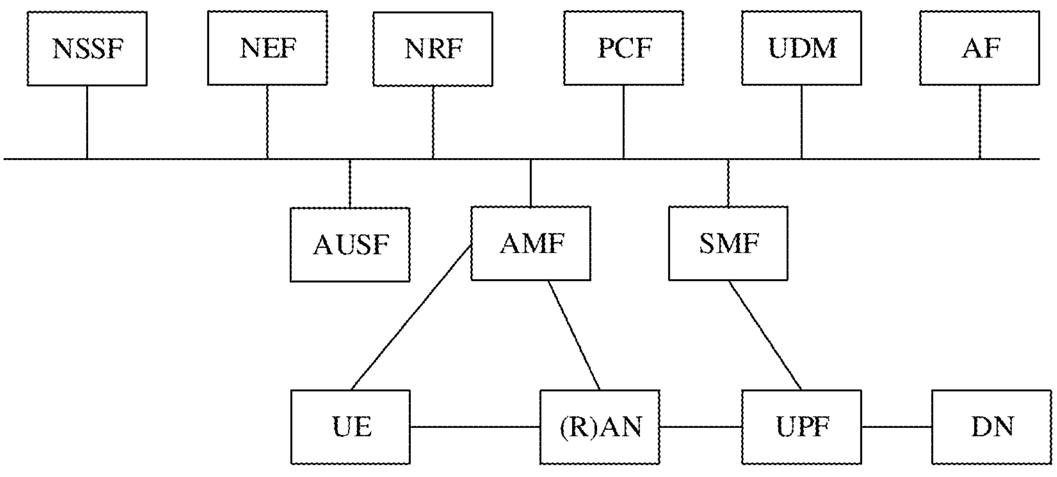
FIG. 1 is a schematic diagram of a network architecture.

First, a network architecture applicable to this application is briefly described as follows:

As an example, FIG. 1 is a schematic diagram of a network architecture.

As shown in FIG. 1, a 5G system (5th generation system, 5GS) is used as an example of the network architecture. The network architecture may include but is not limited to: a network slice selection function (NSSF), an authentication server function (AUSF), unified data management (UDM), a network exposure function (NEF), a network repository function (NF repository function, NRF), a policy control function (PCF), an application function (AF), an access and mobility management function (AMF), a session management function (SMF), user equipment (UE), a radio access network device, a user plane function (UPF), and a data network (DN).

The DN may be the Internet. The NSSF, the AUSF, the UDM, the NEF, the NRF, the PCF, the AF, the AMF, the SMF, and the UPF are network elements in a core network. Because the 5G system is used as an example in FIG. 1, the core network may be referred to as a 5G core network (SGC, or SGCN).

The following briefly describes network elements shown in FIG. 1.

1. The UE may be referred to as a terminal device, an access terminal, a subscriber unit, a subscriber station, a mobile station, a mobile console, a remote station, a remote terminal, a mobile device, a user terminal, a terminal, a wireless communication device, a user agent, or a user apparatus.

The terminal device may be a device that provides voice/data to a user, for example, a hand-held device or vehicle-mounted device with a wireless connection function. Currently, some terminals are, for example, a mobile phone, a tablet computer, a notebook computer, a palmtop computer, a mobile Internet device (MID), a wearable device, a virtual reality (VR) device, an augmented reality (AR) device, a wireless terminal in industrial control), a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a hand-held device or a computing device that has a wireless communication function or another processing device connected to a wireless modem, a wearable device, a terminal device in a 5G network, and a terminal device in a future evolved public land mobile network (PLMN). This is not limited in embodiments of this application.

By way of example rather than limitation, in embodiments of this application, the terminal device may alternatively be a wearable device. The wearable device may also be referred to as a wearable intelligent device, and is a general term of wearable devices that are intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on a smartphone, for example, a smart watch or smart glasses, and devices that focus on only one type of application function and need to work with another device like a smartphone, for example, various smart bands or smart accessories for monitoring physical signs.

In addition, in embodiments of this application, the terminal device may alternatively be a terminal device in an IoT system. IoT is an important part of future development of information technologies. A main technical feature of the IoT is connecting a thing to a network by using a communication technology, to implement an intelligent network for interconnection between a person and a machine or between things.

It should be noted that a terminal device and an access network device may communicate with each other by using an air interface technology (for example, an NR technology or an LTE technology). Terminal devices may also communicate with each other by using an air interface technology (for example, an NR technology or an LTE technology).

In embodiments of this application, an apparatus configured to implement a function of the terminal device may be a terminal device, or may be an apparatus that can support the terminal device in implementing the function, for example, a chip system or a chip. The apparatus may be installed in the terminal device. In embodiments of this application, the chip system may include a chip, or may include a chip and another discrete component.

2. The (radio) access network ((R)AN) device may provide a function of accessing a communication network for an authorized user in a specific area, and may specifically include a wireless network device in a 3rd Generation Partnership Project (3GPP) network, or may include an access point in a non-3GPP network. For ease of description, the following uses an AN device for representation.

The AN device may use different radio access technologies. Currently, there are two types of radio access technologies: a 3GPP access technology (for example, a radio access technology used in a 3rd generation (3G), 4th generation (4G), or 5G system) and a non-3GPP access technology. The 3GPP access technology is an access technology that complies with a 3GPP standard specification. For example, an access network device in the 5G system is referred to as a next generation node base station (next generation Node Base station, gNB) or a RAN device. The non-3GPP access technology may include an air interface technology represented by an access point (AP) in wireless fidelity (Wi-Fi), worldwide interoperability for microwave access (WiMAX), code division multiple access (CDMA), and the like. The AN device may allow interworking between a terminal device and a 3GPP core network by using a non-3GPP technology.

The AN device can be responsible for functions on an air interface side, such as radio resource management, quality of service (QoS) management, and data compression and encryption. The AN device provides an access service for the terminal device, and further completes forwarding of a control signal and user data between the terminal device and a core network.

For example, the AN device may include but is not limited to: a macro base station, a micro base station (which is also referred to as a small cell), a radio network controller (RNC), a NodeB (NB), a base station controller (BSC), a base transceiver station (BTS), a home base station (for example, a home evolved NodeB, or a home NodeB, HNB), a baseband unit (BBU), an AP in a Wi-Fi system, a radio relay node, a radio backhaul node, a transmission point (TP), or a transmission and reception point (TRP), or the like; may be a gNB or a transmission point (TRP or TP) in a 5G (for example, NR) system, or one antenna panel or a group of antenna panels (including a plurality of antenna panels) of a base station in a 5G system; or may be a network node constituting a gNB or a transmission point, for example, a distributed unit (DU), a base station in a next-generation 6G communication system, or the like. A specific technology and a specific device form used by the AN device are not limited in this embodiment of this application.

3. The AMF is mainly configured to perform functions such as access control, mobility management, and attachment and detachment.

4. The SMF is mainly configured to perform user plane network element selection, user plane network element redirection, Internet protocol (IP) address allocation for the terminal device, session establishment, modification, and release, and QoS control.

5. The UPF is mainly configured to receive and forward user plane data. For example, the UPF may receive user plane data from the DN, and send the user plane data to the terminal device through the AN device. The UPF may further receive user plane data from the terminal device through the AN device, and forward the user plane data to the DN.

6. The NEF is mainly configured to securely expose, to the outside, a service, a capability, and the like that are provided by a 3GPP network function.

7. The PCF is mainly configured to guide a unified policy framework for network behavior, provide policy rule information for a control plane network element (for example, the AMF or the SMF), and the like.

8. The AF is mainly configured to provide a service for a 3GPP network, for example, interact with the PCF to perform policy control.

9. The network slice selection function (NSSF) is mainly configured to select a network slice.

10. The UDM is mainly configured to perform subscription data management on the UE, including storage and management of a UE identifier, access authorization of the UE, and the like.

11. The DN is mainly used for an operator network that provides a data service for the UE, for example, the Internet, a third-party service network, and an IP multimedia service (IMS) network.

12. The AUSF is mainly configured to perform user authentication and the like.

13. The NRF is mainly configured to store a network functional entity, description information of a service provided by the network functional entity, and the like.

In the network architecture shown in FIG. 1, the network elements may communicate with each other through interfaces. For example, the UE is connected to the AN device by using a radio resource control (RRC) protocol, and the UE and the AN device communicate with each other through a Uu interface.

It should be understood that the foregoing network architecture is merely an example for description, and the network architecture applicable to embodiments of this application is not limited thereto. Any network architecture that can implement functions of the foregoing network elements is applicable to embodiments of this application.

It should be further understood that functions or network elements such as the AMF, the SMF, the UPF, the PCF, the UDM, the NSSF, and the AUSF shown in FIG. 1 may be understood as network elements configured to implement different functions, for example, may be combined into a network slice as required. These network elements may be independent devices, or may be integrated into a same device to implement different functions, or may be network elements in a hardware device, or may be software functions running on dedicated hardware, or may be instantiated virtualization functions on a platform (for example, a cloud platform). Specific forms of the network elements are not limited in this application.

It should be further understood that the foregoing names are defined merely for distinguishing between different functions, and should not constitute any limitation on this application. This application does not exclude a possibility of using other names in a 6G network and another future network. For example, in the 6G network, some or all of the network elements may still use terms in 5G, or may use other names.

To facilitate understanding of embodiments of this application, terms used in this application are briefly described.

1. A PC5 interface communication mode may be a direct communication mode between UEs. To be specific, in the direct communication mode, communication is performed through a direct link between the UEs, and an operator network (for example, a base station) is not required. Refer to (a) in FIG. 2. The direct link may be, for example, referred to as a PC5 link, a PC5 connection, or a layer-2 link (Layer-2 link).

Generally, in the direct communication mode, communication is performed based on a PC5 interface between UEs. Therefore, the direct communication mode may also be referred to as the PC5 interface communication mode.

Certainly, the direct communication mode is not limited to the PC5 interface communication mode, and may further include a direct communication mode based on another interface. In addition, the PC5 interface communication mode in this application may be replaced with the direct communication mode. This is not limited.

2. A Uu interface communication mode may be a communication mode in which UEs communicate with each other based on a Uu interface. In other words, the UEs communicate with each other through an operator network. The communication mode may be referred to as the Uu interface communication mode. For details, refer to (b) in FIG. 2. For example, the UEs separately establish a protocol data unit (PDU) session based on the Uu interface, and data is communicated between the UEs by using the PDU sessions.

3. A QoS flow is a QoS differentiation granularity in a PDU session or a PC5 link. One QoS flow identifier (QFI) may be used to identify one QoS flow. One PDU session or one PC5 link may include a plurality of QoS flows, and QFIs of the QoS flows are different. In other words, one QFI may be unique in one PDU session.

Further, a QoS flow corresponding to a service may be a QoS flow used to transmit data of the service. For example, when the data of the service is communicated by using a QoS flow in a PDU session or a PC5 link, the QoS flow may be referred to as the QoS flow corresponding to the service. A service carried on a QoS flow may be a service communicated by using the QoS flow.

Further, a QoS requirement of a QoS flow may be a condition that needs to be met by a QoS parameter corresponding to the QoS flow. The QoS parameter may include but is not limited to a rate, a delay, a packet loss rate, a priority, reliability, and the like. For example, the QoS requirement corresponding to the QoS flow is that the rate in the QoS parameter corresponding to the QoS flow needs to meet 7 megabits per second (Mbps), that is, is greater than or equal to 7 Mbps.

If the QoS requirement of the QoS flow is not met, it indicates that the QoS parameter corresponding to the QoS flow cannot meet the QoS requirement. For example, if a QoS requirement corresponding to a QoS flow is a rate of 7 Mbps, but a rate implemented by the QoS parameter corresponding to the QoS flow in actual communication is 5 Mbps, it may be considered that the QoS requirement of the QoS flow is not met.

4. A path selection policy may include a path preference. The path preference represents a path preferred by an application, and may specifically include: PC5 preferred, Uu preferred, or no preference. For example, a path preference of a V2X application represents that the V2X application prefers PC5. The terminal device may obtain the path selection policy from an application server or a PCF.

5. A local switch may be used to indicate that data communicated between terminal devices does not pass through an application server, or may be used to indicate that data communicated between terminal devices does not pass through an N6 interface, or may be used to indicate that data communicated between terminal devices does not pass through an N3 interface. The N6 interface represents an interface between a UPF and a data network, and the application server is located in the data network. That data communicated between terminal devices does not pass through an N6 interface may mean that the data communicated between the terminal devices does not pass through the application server, or the data communicated between the terminal devices is directly forwarded by the UPF. The N3 interface represents an interface between a RAN and a UPF. That data communicated between terminal devices does not pass through an N3 interface may mean that the data communicated between the terminal devices does not pass through the UPF, or the data communicated between the terminal devices is directly forwarded by the RAN.

For example, a local switch is performed on a V2X service between a first terminal device and a second terminal device. When sending data of the V2X service to the second terminal device, the first terminal device sets a destination address of the data of the V2X service to an address of the second terminal device, and the UPF forwards the data to the second terminal device based on the destination address of the data. When sending data of the V2X service to the first terminal device, the second terminal device sets a destination address of the data of the V2X service to an address of the first terminal device, and the UPF forwards the data to the first terminal device based on the destination address of the data of the V2X service.

In this application, "not passing through an application server corresponding to a service" may be understood as "performing a local switch on the service".

It may be understood that the term "and/or" in this specification describes only an association relationship between associated objects and indicate that three relationships may exist. For example, A and/or B may indicate the following three cases: Only A exists, both A and B exist, and only B exists. In addition, the character "/" in this specification generally indicates an "or" relationship between the associated objects.

The foregoing briefly describes the terms in this application, and details are not described in the following embodiments. The following describes in detail a communication mode switching method provided in embodiments of this application with reference to the accompanying drawings. Embodiments provided in this application may be applied to the network architecture shown in FIG. 1. This is not limited.

FIG. 3 is a schematic diagram of a communication mode switching method 300 according to an embodiment of this application. The method 300 may include the following steps.

S301: A first terminal device sends a first message to a second terminal device.

Correspondingly, the second terminal device receives the first message from the first terminal device.

The first message may be used to request to switch at least one service between the first terminal device and the second terminal device from a PC5 interface communication mode to a Uu interface communication mode.

Specifically, the first message may be an existing message, for example, a link modification request message. Alternatively, the first message may be a newly added message, for example, a path switch required message, a path switch request message, a communication mode switch required message, or a communication mode switch request message. This is not limited.

The at least one service between the first terminal device and the second terminal device may be one or more services that are being communicated between the first terminal device and the second terminal device in the PC5 interface communication mode. For brevity, the at least one service between the first terminal device and the second terminal device is denoted as a service #A below.

S302: The second terminal device sends a second message to the first terminal device based on the first message.

Correspondingly, the first terminal device receives the second message from the second terminal device.

The second message may be used to notify (or represent, or indicate) that switching of a first service from the PC5 interface communication mode to the Uu interface communication mode is accepted (or allowed, or agreed). The service #A includes the first service. In other words, the first service belongs to the service #A.

The second message may be an acknowledgment (ACK) message of the first message, and the ACK message may indicate that the second terminal device accepts switching of the first service from the PC5 interface communication mode to the Uu interface communication mode. Specifically, the second message may be a link modification accept message, a path switch command message, a path switch accept message, a communication mode switch command message, or a communication mode switch accept message. This is not limited.

It is clear that the second message may not be an acknowledgment message of the first message, for example, may be a notification message. This is not limited.

The first service may include one or more services. For example, the first service may be the same as the service #A (that is, the first service is all services in the service #A). For another example, the first service may alternatively be some services in the service #A. For brevity, the first service is denoted as a service #B below.

According to the method provided in the foregoing embodiment, the first terminal device sends the first message to the second terminal device, to request to switch the service #A from the PC5 interface communication mode to the Uu interface communication mode, and the second terminal device sends the second message to the first terminal device based on the first message, to notify that switching of the service #B from the PC5 interface communication mode to the Uu interface communication mode is accepted. In this method, through negotiation between the first terminal device and the second terminal device, one or more services can be switched from the PC5 interface communication mode to the Uu interface communication mode. In this way, it is avoided that data of the services is communicated in a fixed communication mode, and a communication requirement of the services can be dynamically met. Further, compared with that another device (for example, a network device) indicates the first terminal device and the second terminal device to switch the service #B from the PC5 interface communication mode to the Uu interface communication mode, the method provided in the foregoing embodiment can reduce signaling overheads caused by the another device (for example, the network device) indicating the first terminal device and the second terminal device to switch the service #B from the PC5 interface communication mode to the Uu interface communication mode. Further, compared with that the first terminal device separately switches the service #A from the PC5 interface communication mode to the Uu interface communication mode, the method provided in the foregoing embodiment avoids a case in which data of some services in the service #A cannot be communicated between the first terminal device and the second terminal device in the Uu interface communication mode if the second terminal device does not accept (or does not agree or does not allow) switching of the some services from the PC5 interface communication mode to the Uu interface communication mode. Therefore, it can be ensured that after the service #B is switched from the PC5 interface communication mode to the Uu interface communication mode, the service #B can be communicated between the first terminal device and the second terminal device in the Uu interface communication mode.

Optionally, in an implementation scenario of the foregoing embodiment, the first message carries information #1, and the information #1 is used by the second terminal device to identify the service #A.

In a first possible manner, the information #1 is identification information of the service #A. The identification information of the service #A may be an identifier of the service #A, for example, an identifier (ID) or a name of the service #A. Alternatively, the identification information of the service #A may be a traffic descriptor of the service #A, for example, an IP descriptor or a domain descriptor corresponding to the service #A.

In a second possible manner, the information #1 is a service type of the service #A. The service type may be used to identify a type of service, for example, a ProSe service type, a provider service identifier (PSID) service type, or an intelligent transport systems application identifier (ITS-AID) service type. Specifically, the ProSe service type may be used to identify a service whose service type is ProSe.

Specifically, it is assumed that services between the first terminal device and the second terminal device include at least two service types, for example, the ProSe service type and the PSID service type, and the first terminal device requests to switch a service of the ProSe service type from the PC5 interface communication mode to the Uu interface communication mode. In this case, the first terminal device may include the ProSe service type in the first message and send the first message to the second terminal device, to request to switch the service of the ProSe service type from the PC5 interface communication mode to the Uu interface communication mode. In this case, the service #A refers to all services whose service types are ProSe service types between the first terminal device and the second terminal device.

In a third possible manner, the information #1 is identification information of a QoS flow corresponding to the service #A, and the identification information is used to identify the QoS flow, for example, a QFI. It should be understood that the QoS flow may be a PC5 QoS flow, namely, a QoS flow corresponding to data of the service #A communicated in the PC5 interface communication mode. Correspondingly, the identification information may be a PC5 QoS flow identifier (PFI). Specifically, it is assumed that services between the first terminal device and the second terminal device correspond to two QoS flows, for example, a QoS flow 1 and a QoS flow 2, and the first terminal device requests to switch a service carried on the QoS flow 1 from the PC5 interface communication mode to the Uu interface communication mode. In this case, the first terminal device may include an identifier of the QoS flow 1 in the first message and send the first message to the second terminal device, to request to switch the service carried on the QoS flow 1 from the PC5 interface communication mode to the Uu interface communication mode. In this case, the service #A is all services carried on the QoS flow 1 between the first terminal device and the second terminal device. The identification information of the QoS flow corresponding to the service #A is carried, so that signaling overheads caused by carrying identifiers of all services carried on the QoS flow can be reduced.

It should be noted that the foregoing is merely an example for description, and all information #1 used by the second terminal device to identify the service #A is applicable to embodiments of this application. This is not limited. In addition, there may be one or more QoS flows corresponding to the service #A. For example, if the service #A is communicated between the first terminal device and the second terminal device by using the QoS flow 1 and the QoS flow 2, the QoS flows corresponding to the service #A include the QoS flow 1 and the QoS flow 2.

Optionally, in another implementation scenario of the foregoing embodiment, the first message carries first indication information, and the first indication information represents (or indicates) that the service #A is switched from the PC5 interface communication mode to the Uu interface communication mode.

The first indication information may be a path switch required indication, a path switch request indication, a communication mode switch required indication, or a communication mode switch request indication. This is not limited.

In a possible implementation, the first indication information is implemented by using one or more bits. For example, it is assumed that one bit is used to indicate whether to switch the service #A from the PC5 interface communication mode to the Uu interface communication mode. If the bit is set to "0", it indicates that the service #A is switched from the PC5 interface communication mode to the Uu interface communication mode. If the bit is set to "1", it indicates that the data of the service #A is still communicated in the current communication mode. It should be understood that the foregoing is merely an example for description, and is not limited.

Optionally, the second message carries information #2, and the information #2 is used by the first terminal device to identify the service #B. The information #2 may be identification information of the service #B, or the information #2 may be a service type of the service #B, or the information #2 may be identification information of a QoS flow corresponding to the service #B. Herein, the QoS flow may be a PC5 QoS flow, namely, a QoS flow corresponding to data of the service #B communicated in the PC5 interface communication mode. The information #1 is similar to the information #2, and a difference lies in that the information #1 is used by the second terminal device to identify the service #A, and the information #2 is used by the first terminal device to identify the service #B. Details are not described herein again.

Further, in an implementation, when the service #A is different from the service #B, the second message carries the information #2, so that the first terminal device can identify the service #B. When the service #A is the same as the service #B, the second message does not carry the information #2. For example, the second message sent by the second terminal device to the first terminal device is an ACK message, and the first terminal device learns, based on the ACK message, that the second terminal device accepts switching of the service #A from the PC5 interface communication mode to the Uu interface communication mode. In this way, signaling overheads caused by carrying the information #2 can be reduced.

Optionally, in another implementation scenario of the foregoing embodiment, step S301 includes: The first terminal device sends the first message to the second terminal device based on first reference information.

The first reference information may include one or more of the following information: a path selection policy, a path switching policy, a QoS requirement of the QoS flow corresponding to the service #A, and signal quality of transmitting the data of the service #A by the first terminal device in the PC5 interface communication mode.

It should be understood that the QoS flow may be a PC5 QoS flow, namely, a QoS flow corresponding to the data of the service #A communicated in the PC5 interface communication mode. Specifically, the QoS flow may be one or more PC5 QoS flows. This is not limited.

The first terminal device may send the first message to the second terminal device based on the first reference information in the following several manners.

Manner 1: The first terminal device sends the first message to the second terminal device based on the QoS requirement of the QoS flow corresponding to the service #A.

For example, when the QoS requirement of the QoS flow corresponding to the service #A is not met, the first terminal device sends the first message to the second terminal device.

For the QoS flow corresponding to the service #A, refer to the foregoing related descriptions. Details are not described again.

It should be noted that the service #A may be all services carried on the QoS flow, or may be some services carried on the QoS flow, namely, one or more services carried on the QoS flow.

In an example, it is assumed that the PC5 interface communication mode is used between the first terminal device and the second terminal device, a service 1 and a service 2 are communicated by using the QoS flow 1, and a service 3 and a service 4 are communicated by using the QoS flow 2. When a QoS requirement of the QoS flow 1 is not met, the service #A may be all services carried on the QoS flow 1, namely, the service 1 and the service 2. The first terminal device may send the first message to the second terminal device, where the first message may carry the identifier of the QoS flow 1, or carry identifiers of the service 1 and the service 2, to request to switch the service #A from the PC5 interface communication mode to the Uu interface communication mode.

Manner 2: The first terminal device sends the first message to the second terminal device based on the signal quality of transmitting the data of the service #A by the first terminal device in the PC5 interface communication mode.

It should be noted that the signal quality of transmitting the data of the service #A by the first terminal device in the PC5 interface communication mode may include: signal quality of receiving the data of the service #A by the first terminal device in the PC5 interface communication mode, and/or signal quality of sending the data of the service #A by the first terminal device in the PC5 interface communication mode. This is not limited.

For example, when the signal quality of transmitting the data of the service #A by the first terminal device in the PC5 interface communication mode is less than a first signal quality threshold, the first terminal device sends the first message to the second terminal device.

The first signal quality threshold may be a predefined threshold, and may be configured by a network side for the terminal device, or may be preset in the terminal device. This is not limited.

It should be noted that the service #A may be all the services communicated between the first terminal device and the second terminal device in the PC5 interface communication mode, or may be some services communicated between the first terminal device and the second terminal device in the PC5 interface communication mode, namely, one or more services communicated in the PC5 interface communication mode.

In an example, if signal quality of all the services communicated between the first terminal device and the second terminal device in the PC5 interface communication mode is less than the first signal quality threshold, the service #A may be all the services communicated in the PC5 interface communication mode. In this case, the first message may not carry the information used to identify the service #A. For example, the first message may carry the first indication information. The first indication information is carried to indicate that all the services communicated in the PC5 interface communication mode are switched from the PC5 interface communication mode to the Uu interface communication mode, so that signaling overheads caused by carrying the information used to identify the service #A can be reduced.

Manner 3: The first terminal device sends the first message to the second terminal device based on the path selection policy.

For example, when the path selection policy includes information about a service for which the Uu interface communication mode is preferably used, and the service for which the Uu interface communication mode is preferably used includes the service #A, the first terminal device sends the first message to the second terminal device. For another example, when the path selection policy includes information about a service for which the PC5 interface communication mode is preferably used, and the service for which the PC5 interface communication mode is preferably used does not include the service #A, the first terminal device sends the first message to the second terminal device.

In a possible case, that the first terminal device sends the first message to the second terminal device based on the path selection policy may mean that when the path selection policy changes, the first terminal device sends the first message to the second terminal device.

That the path selection policy changes may mean that the service for which the Uu interface communication mode is preferably used in the path selection policy changes, and/or the service for which the PC5 interface communication mode is preferably used in the path selection policy changes. For example, before the path selection policy changes, the service for which the Uu interface communication mode is preferably used in the path selection policy does not include the service #A. After the path selection policy changes, the service for which the Uu interface communication mode is preferably used in the path selection policy includes the service #A. In this case, the first terminal device may request, by using the first message, to switch the service #A from the PC5 interface communication mode to the Uu interface communication mode. In a possible implementation, the first terminal device learns, from a PCF or an application server, that the path selection policy changes. Specifically, detailed descriptions are provided below with reference to FIG. 6.

Manner 4: The first terminal device sends the first message to the second terminal device based on the path switching policy.

For example, when the path switching policy includes information about a service for which switching of a communication mode is allowed, and the service for which switching of the communication mode is allowed includes the service #A, the first terminal device sends the first message to the second terminal device.

The path switching policy may be obtained from a network side device, for example, a PCF. This is not limited.

The information about the service for which switching of the communication mode is allowed represents the service for which switching of the communication mode is allowed, for example, is an identifier or a name of the service for which switching of the communication mode is allowed, and may be specifically represented in a form of a service identifier list, or may be represented in another manner. This is not limited.

For another example, when the path switching policy includes information about a service for which switching of a communication mode is prohibited, and the service for which switching of the communication mode is prohibited does not include the service #A, the first terminal device sends the first message to the second terminal device.

The information about the service for which switching of the communication mode is prohibited represents the service for which switching of the communication mode is prohibited, for example, is an identifier or a name of the service for which switching of the communication mode is prohibited, and may be specifically represented in a form of a service identifier list, or may be represented in another manner. This is not limited.

Manner 5: The first terminal device sends the first message to the second terminal device based on the path switching policy and the QoS requirement of the QoS flow corresponding to the service #A.

For example, when the path switching policy includes information about a service for which switching of a communication mode is allowed, and the service for which switching of the communication mode is allowed includes the service #A, if the QoS requirement of the QoS flow corresponding to the service #A is not met, the first terminal device sends the first message to the second terminal device.

For another example, when the path switching policy includes information about a service for which switching of a communication mode is prohibited, and the service for which switching of the communication mode is prohibited does not include the service #A, if the QoS requirement of the QoS flow corresponding to the service #A is not met, the first terminal device sends the first message to the second terminal device.

It should be noted that the service #A may be all services carried on the QoS flow, or may be some services carried on the QoS flow, namely, one or more services carried on the QoS flow.

In an example, it is assumed that the PC5 interface communication mode is used between the first terminal device and the second terminal device, a service 1 and a service 2 are communicated by using the QoS flow 1, and a service 3 and a service 4 are communicated by using the QoS flow 2. If the service for which switching of the communication mode is allowed includes the service 1 and the service 2, when a QoS requirement of the QoS flow 1 is not met, the service #A may be all services carried on the QoS flow 1, namely, the service 1 and the service 2. The first terminal device may send the first message to the second terminal device, where the first message may carry the identifier of the QoS flow 1, or carry identifiers of the service 1 and the service 2, to request to switch the service #A from the PC5 interface communication mode to the Uu interface communication mode. If the service for which switching of the communication mode is prohibited includes the service 2, when a QoS requirement of the QoS flow 1 is not met, the service #A may be some services carried on the QoS flow 1, namely, the service 1. The first terminal device may send the first message to the second terminal device, where the first message may carry an identifier of the service 1, to request to switch the service #A from the PC5 interface communication mode to the Uu interface communication mode.

It should be noted that a sequence of a determining condition based on the path switching policy and a determining condition based on the QoS requirement of the QoS flow corresponding to the service #A may be adjusted. For example, when the QoS requirement of the QoS flow corresponding to the service #A is not met, if the service for which switching of the communication mode is allowed includes the service #A, the first terminal device sends the first message to the second terminal device.

Manner 6: The first terminal device sends the first message to the second terminal device based on the path switching policy and the signal quality of transmitting the data of the service #A by the first terminal device in the PC5 interface communication mode.

For example, when the path switching policy includes information about a service for which switching of a communication mode is allowed, and the service for which switching of the communication mode is allowed includes the service #A, if the signal quality of transmitting the data of the service #A by the first terminal device in the PC5 interface communication mode is less than a first signal quality threshold, the first terminal device sends the first message to the second terminal device.

For another example, when the path switching policy includes information about a service for which switching of a communication mode is prohibited, and the service for which switching of the communication mode is prohibited does not include the service #A, if the signal quality of transmitting the data of the service #A by the first terminal device in the PC5 interface communication mode is less than a first signal quality threshold, the first terminal device sends the first message to the second terminal device.

It should be noted that the service #A may be all the services communicated between the first terminal device and the second terminal device in the PC5 interface communication mode, or may be some services communicated between the first terminal device and the second terminal device in the PC5 interface communication mode, namely, one or more services communicated in the PC5 interface communication mode.

In an example, it is assumed that the service for which switching of the communication mode is allowed includes all the services between the first terminal device and the second terminal device. If signal quality of transmitting data of all the services between the first terminal device and the second terminal device in the PC5 interface communication mode is less than the first signal quality threshold, the service #A may be all the services communicated in the PC5 interface communication mode, and the first terminal device may send the first message to the second terminal device. In this case, the first message may not carry the information used to identify the service #A. For example, the first message may carry the first indication information. The first indication information is carried to indicate that all the services communicated in the PC5 interface communication mode are switched from the PC5 interface communication mode to the Uu interface communication mode, so that signaling overheads caused by carrying the information used to identify the service #A can be reduced.

It should be noted that a sequence of a determining condition based on the path switching policy and a determining condition based on the signal quality of transmitting the data of the service #A in the PC5 interface communication mode may be adjusted. For example, when the signal quality of transmitting the data of the service #A in the PC5 interface communication mode is less than the first signal quality threshold, if the service for which switching of the communication mode is allowed includes the service #A, the first terminal device sends the first message to the second terminal device.

Manner 7: The first terminal device sends the first message to the second terminal device based on the path selection policy and the QoS requirement of the QoS flow corresponding to the service #A.

For example, when the path selection policy includes information about a service for which the Uu interface communication mode is preferably used, and the service for which the Uu interface communication mode is preferably used includes the service #A, if the QoS requirement of the QoS flow corresponding to the service #A is not met, the first terminal device sends the first message to the second terminal device.

For another example, when the path selection policy includes information about a service for which the PC5 interface communication mode is preferably used, and the service for which the PC5 interface communication mode is preferably used does not include the service #A, if the QoS requirement of the QoS flow corresponding to the service #A is not met, the first terminal device sends the first message to the second terminal device.

It should be noted that the service #A may be all services carried on the QoS flow, or may be some services carried on the QoS flow, namely, one or more services carried on the QoS flow.

In an example, it is assumed that the PC5 interface communication mode is used between the first terminal device and the second terminal device, a service 1 and a service 2 are communicated by using the QoS flow 1, and a service 3 and a service 4 are communicated by using the QoS flow 2. If the service for which the Uu interface communication mode is preferably used includes the service 1 and the service 2, when a QoS requirement of the QoS flow 1 is not met, the service #A may be all services carried on the QoS flow 1, namely, the service 1 and the service 2. The first terminal device may send the first message to the second terminal device, where the first message may carry the identifier of the QoS flow 1, or carry identifiers of the service 1 and the service 2, to request to switch the service #A from the PC5 interface communication mode to the Uu interface communication mode. If the service for which the PC5 interface communication mode is preferably used includes the service 2, when a QoS requirement of the QoS flow 1 is not met, the service #A may be some services carried on the QoS flow 1, namely, the service 1. The first terminal device may send the first message to the second terminal device, where the first message may carry an identifier of the service 1, to request to switch the service #A from the PC5 interface communication mode to the Uu interface communication mode.

It should be noted that a sequence of a determining condition based on the path selection policy and a determining condition based on the QoS requirement of the QoS flow corresponding to the service #A may be adjusted. For example, when the QoS requirement of the QoS flow corresponding to the service #A is not met, if the service for which the Uu interface communication mode is preferably used includes the service #A, the first terminal device sends the first message to the second terminal device.

Manner 8: The first terminal device sends the first message to the second terminal device based on the path selection policy and the signal quality of transmitting the data of the service #A by the first terminal device in the PC5 interface communication mode.

For example, when the path selection policy includes information about a service for which the Uu interface communication mode is preferably used, and the service for which the Uu interface communication mode is preferably used includes the service #A, if the signal quality of transmitting the data of the service #A by the first terminal device in the PC5 interface communication mode is less than a first signal quality threshold, the first terminal device sends the first message to the second terminal device.

For another example, when the path selection policy includes information about a service for which the PC5 interface communication mode is preferably used, and the service for which the PC5 interface communication mode is preferably used does not include the service #A, if the signal quality of transmitting the data of the service #A by the first terminal device in the PC5 interface communication mode is less than a first signal quality threshold, the first terminal device sends the first message to the second terminal device.

It should be noted that the service #A may be all the services communicated between the first terminal device and the second terminal device in the PC5 interface communication mode, or may be some services communicated between the first terminal device and the second terminal device in the PC5 interface communication mode, namely, one or more services communicated in the PC5 interface communication mode.

In an example, it is assumed that the service for which the Uu interface communication mode is preferably used includes all the services between the first terminal device and the second terminal device. If signal quality of transmitting data of all the services between the first terminal device and the second terminal device in the PC5 interface communication mode is less than the first signal quality threshold, the service #A may be all the services communicated in the PC5 interface communication mode, and the first terminal device may send the first message to the second terminal device. In this case, the first message may not carry the information used to identify the service #A.

It should be noted that a sequence of a determining condition based on the path selection policy and a determining condition based on the signal quality of transmitting the data of the service #A by the first terminal device in the PC5 interface communication mode may be adjusted. For example, when the signal quality of transmitting the data of the service #A in the PC5 interface communication mode is less than the first signal quality threshold, if the service for which the Uu interface communication mode is preferably used includes the service #A, the first terminal device sends the first message to the second terminal device.

Manner 9: The first terminal device sends the first message to the second terminal device based on the path selection policy, the path switching policy, and the QoS requirement of the QoS flow corresponding to the service #A.

For example, when the path selection policy includes information about a service for which the Uu interface communication mode is preferably used, the service for which the Uu interface communication mode is preferably used includes the service #A, the path switching policy includes information about a service for which switching of a communication mode is allowed, and the service for which switching of the communication mode is allowed includes the service #A, if the QoS requirement of the QoS flow corresponding to the service #A is not met, the first terminal device sends the first message to the second terminal device.

It should be noted that the service #A may be all services carried on the QoS flow, or may be some services carried on the QoS flow, namely, one or more services carried on the QoS flow. For details, refer to the foregoing related descriptions. Details are not described again.

It should be noted that a sequence of a determining condition based on the path selection policy, a determining condition based on the QoS requirement of the QoS flow corresponding to the service #A, and a determining condition based on the path switching policy may be adjusted. For example, when the QoS requirement of the QoS flow corresponding to the service #A is not met, if the service for which the Uu interface communication mode is preferably used includes the service #A, and the service for which switching of the communication mode is allowed includes the service #A, the first terminal device sends the first message to the second terminal device.

Manner 10: The first terminal device sends the first message to the second terminal device based on the path selection policy, the path switching policy, and the signal quality of transmitting the data of the service #A by the first terminal device in the PC5 interface communication mode.

For example, when the path selection policy includes information about a service for which the Uu interface communication mode is preferably used, the service for which the Uu interface communication mode is preferably used includes the service #A, the path switching policy includes information about a service for which switching of a communication mode is allowed, and the service for which switching of the communication mode is allowed includes the service #A, if the signal quality of transmitting the data of the service #A by the first terminal device in the PC5 interface communication mode is less than a first signal quality threshold, the first terminal device sends the first message to the second terminal device.

It should be noted that the service #A may be all the services communicated between the first terminal device and the second terminal device in the PC5 interface communication mode, or may be some services communicated between the first terminal device and the second terminal device in the PC5 interface communication mode, namely, one or more services communicated in the PC5 interface communication mode. For details, refer to the foregoing related descriptions. Details are not described again.

It should be noted that a sequence of a determining condition based on the path selection policy, a determining condition based on the signal quality of transmitting the data of the service #A by the first terminal device in the PC5 interface communication mode, and a determining condition based on the path switching policy may be adjusted. For example, when the signal quality of transmitting the data of the service #A in the PC5 interface communication mode is less than the first signal quality threshold, if the service for which the Uu interface communication mode is preferably used includes the service #A, and the service for which switching of the communication mode is allowed includes the service #A, the first terminal device sends the first message to the second terminal device.

It may be understood that the foregoing ten manners are merely examples for description, and are not limited.

Optionally, in another implementation scenario of the foregoing embodiment, the method 300 further includes: The second terminal device determines, based on second reference information, to accept switching of the service #B from the PC5 interface communication mode to the Uu interface communication mode.

That the second terminal device determines, based on second reference information, to accept switching of the service #B from the PC5 interface communication mode to the Uu interface communication mode may also be understood as that the second terminal device sends the second message to the first terminal device based on the second reference information and the first message.

The second reference information may include one or more of the following information: a path selection policy, a path switching policy, and signal quality of a Uu interface of the second terminal device.

Specifically, the signal quality of the Uu interface of the second terminal device may be signal quality of transmitting data of at least one service by the second terminal device in the Uu interface communication mode. The at least one service may be one or more services in services currently communicated in the Uu interface communication mode. This is not limited.

In addition, for the path selection policy and the path switching policy, refer to the foregoing related descriptions. Details are not described again.

The second terminal device may determine, based on second reference information, to accept switching of the service #B from the PC5 interface communication mode to the Uu interface communication mode in the following several implementations.

Implementation 1: The second terminal device determines, based on the signal quality of the Uu interface of the second terminal device, to accept switching of the service #B from the PC5 interface communication mode to the Uu interface communication mode.

The signal quality of the Uu interface of the second terminal device may be current signal quality of the Uu interface of the second terminal device, or may be historical signal quality of the Uu interface of the second terminal device, for example, signal quality of the Uu interface in a preset time period before a current time point.

It should be noted that the signal quality of the Uu interface of the second terminal device may include signal quality of receiving data by the second terminal device through the Uu interface, and/or signal quality of sending data by the second terminal device through the Uu interface. This is not limited.

For example, when the signal quality of the Uu interface of the second terminal device meets a QoS requirement of the service #B, the second terminal device determines to accept switching of the service #B from the PC5 interface communication mode to the Uu interface communication mode.

The QoS requirement may be from a network side, for example, an AMF or a PCF, or may be from the first terminal device. This is not limited.

That the signal quality of the Uu interface of the second terminal device meets a QoS requirement of the service #B may mean that the second terminal device obtains a QoS parameter based on the signal quality of the Uu interface, and the obtained QoS parameter meets the QoS requirement of the service #B. Specifically, how to obtain the QoS parameter based on the signal quality belongs to the conventional technology, and details are not described again.

For another example, when the signal quality of the Uu interface of the second terminal device is greater than or equal to a second signal quality threshold, the second terminal device determines to accept switching of the service #B from the PC5 interface communication mode to the Uu interface communication mode. In this case, the service #B may be the service #A, or may be any one or more services in the service #A.

Specifically, if the signal quality of the Uu interface of the second terminal device is greater than or equal to the second signal quality threshold, the second terminal device may determine to accept switching of the service #A from the PC5 interface communication mode to the Uu interface communication mode. In this case, the service #B is the same as the service #A, and the second message may not carry the information used to identify the service #B. For example, the second message may respond to only the first message, to indicate that the request of the first message is accepted.

For another example, when the signal quality of the Uu interface of the second terminal device is greater than or equal to a second signal quality threshold, if the signal quality of the Uu interface of the second terminal device meets the QoS requirement of the service #B, the second terminal device determines to accept switching of the service #B from the PC5 interface communication mode to the Uu interface communication mode.

The second signal quality threshold may be from a network side, for example, an AMF or a PCF, or may be a predefined threshold. This is not limited.

Implementation 2: The second terminal device determines, based on the path selection policy, to accept switching of the service #B from the PC5 interface communication mode to the Uu interface communication mode.

For example, when the path selection policy includes information about a service for which the Uu interface communication mode is preferably used, and the service for which the Uu interface communication mode is preferably used includes the service #B, the second terminal device determines to accept switching of the service #B from the PC5 interface communication mode to the Uu interface communication mode.

For another example, when the path selection policy includes information about a service for which the PC5 interface communication mode is preferably used, and the service for which the PC5 interface communication mode is preferably used does not include the service #B, the second terminal device determines to accept switching of the service #B from the PC5 interface communication mode to the Uu interface communication mode.

Implementation 3: The second terminal device determines, based on the path switching policy, to accept switching of the service #B from the PC5 interface communication mode to the Uu interface communication mode.

For example, when the path switching policy includes information about a service for which switching of a communication mode is allowed, and the service for which switching of the communication mode is allowed includes the service #B, the second terminal device determines to accept switching of the service #B from the PC5 interface communication mode to the Uu interface communication mode.

For another example, when the path switching policy includes information about a service for which switching of a communication mode is prohibited, and the service for which switching of the communication mode is prohibited does not include the service #B, the second terminal device determines to accept switching of the service #B from the PC5 interface communication mode to the Uu interface communication mode.

Implementation 4: The second terminal device determines, based on the path switching policy and the signal quality of the Uu interface of the second terminal device, to accept switching of the service #B from the PC5 interface communication mode to the Uu interface communication mode.

For example, when the path switching policy includes information about a service for which switching of a communication mode is allowed, and the service for which switching of the communication mode is allowed includes the service #B, if the signal quality of the Uu interface of the second terminal device meets a QoS requirement of the service #B, the second terminal device determines to accept switching of the service #B from the PC5 interface communication mode to the Uu interface communication mode.

For another example, when the path switching policy includes information about a service for which switching of a communication mode is allowed, and the service for which switching of the communication mode is allowed includes the service #B, if the signal quality of the Uu interface of the second terminal device is greater than or equal to a second signal quality threshold, the second terminal device determines to accept switching of the service #B from the PC5 interface communication mode to the Uu interface communication mode.

It should be noted that a sequence of a determining condition based on the path switching policy and a determining condition based on the signal quality of the Uu interface of the second terminal device may be adjusted. For example, when the signal quality of the Uu interface of the second terminal device meets the QoS requirement of the service #B, if the service for which switching of the communication mode is allowed includes the service #B, the second terminal device determines to accept switching of the service #B from the PC5 interface communication mode to the Uu interface communication mode.

Implementation 5: The second terminal device determines, based on the path selection policy and the signal quality of the Uu interface of the second terminal device, to accept switching of the service #B from the PC5 interface communication mode to the Uu interface communication mode.

For example, when the path selection policy includes information about a service for which the Uu interface communication mode is preferably used, and the service for which the Uu interface communication mode is preferably used includes the service #B, if the signal quality of the Uu interface of the second terminal device meets a QoS requirement of the service #B, the second terminal device determines to accept switching of the service #B from the PC5 interface communication mode to the Uu interface communication mode.

For another example, when the path selection policy includes information about a service for which the Uu interface communication mode is preferably used, and the service for which the Uu interface communication mode is preferably used includes the service #B, if the signal quality of the Uu interface of the second terminal device is greater than or equal to a second signal quality threshold, the second terminal device determines to accept switching of the service #B from the PC5 interface communication mode to the Uu interface communication mode.

It should be noted that a sequence of a determining condition based on the path selection policy and a determining condition based on the signal quality of the Uu interface of the second terminal device may be adjusted. For example, when the signal quality of the Uu interface of the second terminal device meets the QoS requirement of the service #B, if the service for which the Uu interface communication mode is preferably used includes the service #B, the second terminal device determines to accept switching of the service #B from the PC5 interface communication mode to the Uu interface communication mode.

Implementation 6: The second terminal device determines, based on the path selection policy, the path switching policy, and the signal quality of the Uu interface of the second terminal device, to accept switching of the service #B from the PC5 interface communication mode to the Uu interface communication mode.

For example, when the path selection policy includes information about a service for which the Uu interface communication mode is preferably used, the service for which the Uu interface communication mode is preferably used includes the service #B, the path switching policy includes information about a service for which switching of a communication mode is allowed, and the service for which switching of the communication mode is allowed includes the service #B, if the signal quality of the Uu interface of the second terminal device meets a QoS requirement of the service #B, the second terminal device determines to accept switching of the service #B from the PC5 interface communication mode to the Uu interface communication mode.

For another example, when the path selection policy includes information about a service for which the Uu interface communication mode is preferably used, the service for which the Uu interface communication mode is preferably used includes the service #B, the path switching policy includes information about a service for which switching of a communication mode is allowed, and the service for which switching of the communication mode is allowed includes the service #B, if the signal quality of the Uu interface of the second terminal device is greater than or equal to a second signal quality threshold, the second terminal device determines to accept switching of the service #B from the PC5 interface communication mode to the Uu interface communication mode.

It should be noted that a sequence of a determining condition based on the path switching policy, a determining condition based on the path selection policy, and a determining condition based on the signal quality of the Uu interface of the second terminal device may be adjusted. For example, when the signal quality of the Uu interface of the second terminal device meets the QoS requirement of the service #B, if the service for which switching of the communication mode is allowed includes the service #B, and the service for which the Uu interface communication mode is preferably used includes the service #B, the second terminal device determines to accept switching of the service #B from the PC5 interface communication mode to the Uu interface communication mode.

It may be understood that the foregoing six implementations are merely examples for description, and are not limited.

Optionally, in another implementation scenario of the foregoing embodiment, the method 300 further includes: The first terminal device sends a first QoS parameter to the second terminal device.

Correspondingly, the second terminal device receives the first QoS parameter from the first terminal device.

The first QoS parameter may be used by the first terminal device to transmit data of the service #B in the Uu interface communication mode. Specifically, the first QoS parameter may include one or more of the following: a rate, a delay, a packet loss rate, a priority, reliability, and a 5G QoS identifier (5QI).

Alternatively, the first QoS parameter is a QoS parameter that is authorized by a core network to be used when the first terminal device transmits the data of the service #B in the Uu interface communication mode. The core network may be a device in the core network, for example, a PCF or an AMF. This is not limited.

It may be understood that the authorization may be permission or agreement, and is not limited.

It should be noted that if the service #B is all services carried on a QoS flow (namely, a PC5 QoS flow), the first QoS parameter may be used by the first terminal device to transmit, in the Uu interface communication mode, data of all the services carried on the QoS flow. For example, the PC5 interface communication mode is used between the first terminal device and the second terminal device, a service 1 and a service 2 are communicated by using the QoS flow 1, and a service 3 and a service 4 are communicated by using the QoS flow 2. The first terminal device sends the first message to the second terminal device, to request to switch all services (namely, the service 1 and the service 2) carried on the QoS flow 1 from the PC5 interface communication mode to the Uu interface communication mode. The second terminal device sends the second message to the first terminal device based on the first message, to notify the first terminal device that switching of all the services (namely, the service 1 and the service 2) carried on the QoS flow 1 from the PC5 interface communication mode to the Uu interface communication mode is accepted. In this case, the service #B is all the services carried on the QoS flow 1 between the first terminal device and the second terminal device. The first QoS parameter may be used by the first terminal device to transmit, in the Uu interface communication mode, data of all the services carried on the QoS flow 1. In other words, the first QoS parameter may be used by the first terminal device to transmit data of the service 1 and the service 2 in the Uu interface communication mode.

Optionally, the method 300 further includes: The second terminal device determines a second QoS parameter based on the first QoS parameter.

The second QoS parameter may be used by the second terminal device to transmit data of the service #B in the Uu interface communication mode. Specifically, the second QoS parameter may include one or more of the following: a rate, a delay, a packet loss rate, a priority, reliability, and a 5QI.

Alternatively, the second QoS parameter is a QoS parameter that is authorized by a core network to be used when the second terminal device transmits the data of the service #B in the Uu interface communication mode. The core network may be a device in the core network, for example, a PCF or an AMF. This is not limited.

It should be noted that if the service #B is all services carried on a QoS flow (namely, a PC5 QoS flow), the second QoS parameter may be used by the second terminal device to transmit, in the Uu interface communication mode, data of all the services carried on the QoS flow.

In an example, the second terminal device determines the rate in the second QoS parameter based on the rate in the first QoS parameter. Specifically, the rate that is in the second QoS parameter and that is determined by the second terminal device may be the same as or different from the rate in the first QoS parameter. For example, the rate that is in the second QoS parameter and that is determined by the second terminal device is greater than the rate in the first QoS parameter. This is not limited.

In another example, the second terminal device determines the delay in the second QoS parameter based on the delay in the first QoS parameter. Specifically, the delay that is in the second QoS parameter and that is determined by the second terminal device may be the same as or different from the delay in the first QoS parameter. This is not limited.

It should be noted that the foregoing examples are merely examples for description, and are not limited herein. For example, the second terminal device may update the second QoS parameter based on the first QoS parameter (where the second QoS parameter is a second QoS parameter determined by the second terminal device before the second terminal device receives the first QoS parameter from the first terminal device).

Optionally, before the first terminal device sends the first QoS parameter to the second terminal device, the method 300 further includes: The first terminal device determines the first QoS parameter based on a third QoS parameter.

The third QoS parameter may be used by the first terminal device to transmit data of the service #B in the PC5 interface communication mode. Specifically, the third QoS parameter may include one or more of the following: a rate, a delay, a packet loss rate, a priority, reliability, and a PC5 5G QoS identifier (PQI).

In an example, the first terminal device determines the rate in the first QoS parameter based on the rate in the third QoS parameter. Specifically, the rate that is in the first QoS parameter and that is determined by the first terminal device may be greater than or equal to the rate in the third QoS parameter.

In another example, the first terminal device determines the delay in the first QoS parameter based on the delay in the third QoS parameter. Specifically, the delay that is in the first QoS parameter and that is determined by the first terminal device may be less than or equal to the delay in the third QoS parameter.

The first terminal device may determine the first QoS parameter based on the QoS parameter (namely, the third QoS parameter) of transmitting the service #B in the PC5 interface communication mode that is used before the communication mode is switched. For example, the rate in the first QoS parameter is greater than or equal to the rate in the QoS parameter of transmitting the service #B in the PC5 interface communication mode that is used before the communication mode is switched. In this way, communication performance of transmitting the data of the service #B in the Uu interface communication mode can be improved.

It should be understood that there are many manners in which the first terminal device determines the first QoS parameter. This is not limited. For example, there is a correspondence between the third QoS parameter and the first QoS parameter, and the first terminal device may determine the first QoS parameter based on the third QoS parameter and the correspondence. The correspondence may be a correspondence between a PQI and a 5QI, and the correspondence may be preconfigured in the first terminal device or obtained by the first terminal device from the PCF.

Optionally, after the first terminal device determines the first QoS parameter based on the third QoS parameter, the method 300 further includes: The first terminal device sends a first request message to the core network (for example, the PCF or the AMF), where the first request message is used to request to authorize using of the first QoS parameter when the data of the service #B is communicated in the Uu interface communication mode.

Further, the method 300 may include: The core network sends a response to the first request message to the first terminal device.

In an example, the response to the first request message is used to acknowledge that the first terminal device is authorized to use the first QoS parameter when the data of the service #B is communicated in the Uu interface communication mode. For example, the response to the first request message is an ACK, and the first terminal device may learn, based on the ACK, that the core network authorizes the first terminal device to use the first QoS parameter when the data of the service #B is communicated in the Uu interface communication mode. Further, that the first terminal device sends the first QoS parameter to the second terminal device may be replaced with the following: After the core network authorizes the first terminal device to use the first QoS parameter when the data of the service #B is communicated in the Uu interface communication mode, the first terminal device sends the first QoS parameter to the second terminal device.

In another example, the response to the first request message includes a QoS parameter (which may be referred to as a QoS parameter authorized by the core network to the first terminal device for use for short) that is authorized by the core network to be used when the first terminal device transmits the data of the service #B in the Uu interface communication mode. Specifically, if the QoS parameter authorized by the core network to the first terminal device for use is different from the first QoS parameter, the core network may send, to the first terminal device, the QoS parameter authorized by the core network to the first terminal device for use. Further, that the first terminal device sends the first QoS parameter to the second terminal device may be replaced with the following: The first terminal device sends, to the second terminal device, the QoS parameter authorized by the core network to the first terminal device for use.

It should be noted that the first terminal device may send the first QoS parameter to the second terminal device after receiving the second message from the second terminal device. Alternatively, before receiving the second message from the second terminal device, the first terminal device may send the first QoS parameter to the second terminal device. For example, the first message sent by the first terminal device to the second terminal device carries the first QoS parameter. This is not limited.

Optionally, in another implementation scenario of the foregoing embodiment, the method 300 further includes: The first terminal device sends a second QoS parameter to the second terminal device.

Correspondingly, the second terminal device receives the second QoS parameter from the first terminal device. The first terminal device may recommend or suggest the second QoS parameter to the second terminal device, thereby reducing resource consumption caused by determining the second QoS parameter by the second terminal device.

For the second QoS parameter, refer to the foregoing related descriptions. Details are not described again.

Optionally, after the second terminal device receives the second QoS parameter from the first terminal device, the method 300 further includes: The second terminal device sends a second request message to the core network (for example, the PCF or the AMF), where the second request message is used to request to authorize using of the second QoS parameter when the data of the service #B is communicated in the Uu interface communication mode.

Further, the method 300 may include: The core network sends a response to the second request message to the second terminal device.

In an example, the response to the second request message is used to acknowledge that the second terminal device is authorized to use the second QoS parameter when the data of the service #B is communicated in the Uu interface communication mode. For example, the response to the second request message is an ACK, and the second terminal device may learn, based on the ACK, that the core network authorizes the second terminal device to use the second QoS parameter when the data of the service #B is communicated in the Uu interface communication mode. Further, the method 300 may include: After the core network authorizes the second terminal device to use the second QoS parameter when the data of the service #B is communicated in the Uu interface communication mode, the second terminal device sends an ACK message to the first terminal device, to indicate that the second terminal device accepts (or allows, or agrees) the second QoS parameter recommended (or suggested, or requested, or indicated) by the first terminal device.

In another example, the response to the second request message includes a QoS parameter (which may be referred to as a QoS parameter authorized by the core network to the second terminal device for use for short) that is authorized by the core network to be used when the second terminal device transmits the data of the service #B in the Uu interface communication mode. Specifically, if the QoS parameter authorized by the core network to the second terminal device for use is different from the second QoS parameter, the core network may send, to the second terminal device, the QoS parameter authorized by the core network to the second terminal device for use. Further, the method 300 may include: The second terminal device sends, to the first terminal device, the QoS parameter authorized by the core network to the second terminal device for use. Further, the first terminal device may determine the first QoS parameter based on the QoS parameter authorized by the core network to the second terminal device for use.

Optionally, the method 300 further includes: The first terminal device determines the second QoS parameter based on a third QoS parameter.

For a manner in which the first terminal device determines the second QoS parameter, refer to the foregoing manner in which the first terminal device determines the first QoS parameter. Details are not described herein again.

It should be noted that the first terminal device may send the second QoS parameter to the second terminal device after receiving the second message from the second terminal device. Alternatively, before receiving the second message from the second terminal device, the first terminal device may send the second QoS parameter to the second terminal device. For example, the first message sent by the first terminal device to the second terminal device carries the second QoS parameter.

Optionally, in another implementation scenario of the foregoing embodiment, the method 300 further includes: The second terminal device sends a second QoS parameter to the first terminal device.

Correspondingly, the first terminal device receives the second QoS parameter from the second terminal device.

For the second QoS parameter, refer to the foregoing related descriptions. Details are not described again.

Optionally, the method 300 further includes: The first terminal device determines a first QoS parameter based on the second QoS parameter.

Specifically, for determining the first QoS parameter by the first terminal device based on the second QoS parameter, refer to the foregoing manner in which the second terminal device determines the second QoS parameter based on the received first QoS parameter. Details are not described herein again.

Optionally, before the second terminal device sends the second QoS parameter to the first terminal device, the method 300 further includes: The second terminal device determines the second QoS parameter based on a third QoS parameter.

Specifically, for determining the second QoS parameter by the second terminal device based on the third QoS parameter, refer to the foregoing manner in which the first terminal device determines the first QoS parameter. Details are not described herein again.

Optionally, after the second terminal device determines the second QoS parameter based on the third QoS parameter, the method 300 further includes: The second terminal device sends a third request message to the core network (for example, the PCF or the AMF), where the third request message is used to request to authorize using of the second QoS parameter when the data of the service #B is communicated in the Uu interface communication mode.

Further, the method 300 may include: The core network sends a response to the third request message to the second terminal device.

In an example, the response to the third request message is used to acknowledge that the second terminal device is authorized to use the second QoS parameter when the data of the service #B is communicated in the Uu interface communication mode. For example, the response to the third request message is an ACK, and the second terminal device may learn, based on the ACK, that the core network authorizes the second terminal device to use the second QoS parameter when the data of the service #B is communicated in the Uu interface communication mode. Further, that the second terminal device sends the second QoS parameter to the first terminal device may be replaced with the following: After the core network authorizes the second terminal device to use the second QoS parameter when the data of the service #B is communicated in the Uu interface communication mode, the second terminal device sends the second QoS parameter to the first terminal device.

In another example, the response to the third request message includes a QoS parameter (which may be referred to as a QoS parameter authorized by the core network to the second terminal device for use for short) that is authorized by the core network to be used when the second terminal device transmits the data of the service #B in the Uu interface communication mode. Specifically, if the QoS parameter authorized by the core network to the second terminal device for use is different from the second QoS parameter, the core network may send, to the second terminal device, the QoS parameter authorized by the core network to the second terminal device for use. Further, that the second terminal device sends the second QoS parameter to the first terminal device may be replaced with the following: The second terminal device sends, to the first terminal device, the QoS parameter authorized by the core network to the second terminal device for use.

It should be noted that the second terminal device may send the second QoS parameter to the first terminal device after sending the second message to the first terminal device. Alternatively, the second message sent by the second terminal device to the first terminal device carries the second QoS parameter.

It may be understood that the foregoing examples are merely examples for description, and this application is not limited thereto.

Optionally, in another implementation scenario of the foregoing embodiment, the first message sent by the first terminal device to the second terminal device in step S301 carries second indication information.

The second indication information may represent that when the data of the service #A is communicated in the Uu interface communication mode, an application server corresponding to the service #A is not passed through. That "the application server corresponding to the service #A is not passed through when the data of the service #A is communicated" may be replaced with "a local switch is performed on the service #A".

Optionally, after the second terminal device receives the first message, the method 300 further includes: The second terminal device sends address information of the second terminal device to the first terminal device.

The address information of the second terminal device may be used to transmit data of the service #B between the first terminal device and the second terminal device in the Uu interface communication mode. Specifically, the address information of the second terminal device may include an IP address and a port number of the second terminal device.

Specifically, after receiving the first message, the second terminal device may learn, based on the second indication information carried in the first message, that when the data of the service #A is communicated in the Uu interface communication mode, the application server of the service #A is not passed through (or the local switch is performed on the service #A). Further, the second terminal device may send the address information of the second terminal device to the first terminal device. For example, the second message sent by the second terminal device to the first terminal device in step S302 carries the address information of the second terminal device.

Further, that the first terminal device sends the first message to the second terminal device in step S301 may include: When the first terminal device learns that the application server of the service #A is not passed through when the data of the service #A is communicated in the Uu interface communication mode (or the local switch is performed on the service #A), the first terminal device sends the first message to the second terminal device, where the first message carries the second indication information.

A manner in which the first terminal device learns that the application server of the service #A is not passed through when the data of the service #A is communicated in the Uu interface communication mode is not specifically limited in this application. In a possible implementation, the first terminal device learns, from a network side (for example, the PCF or the application server) or local preconfigured information, that the local switch is allowed to be performed on the service #A. Specifically, if the first terminal device learns, from the network side (for example, the PCF or the application server) or the local preconfigured information, that the local switch is allowed to be performed on the service #A, the first message sent by the first terminal device to the second terminal device may carry the second indication information.

It should be noted that the foregoing is merely an example for description, and this application is not limited thereto. For example, when the first terminal device fails to obtain an address of the application server corresponding to the service #A, the first message sent by the first terminal device to the second terminal device may also carry the second indication information.

Optionally, in another implementation scenario of the foregoing embodiment, after step S302, the method 300 further includes: The first terminal device sends third indication information to the second terminal device.

Correspondingly, the second terminal device receives the third indication information from the first terminal device.

The third indication information may represent that when the data of the service #B is communicated in the Uu interface communication mode, an application server corresponding to the service #B is not passed through. That "the application server corresponding to the service #B is not passed through when the data of the service #B is communicated" may be replaced with "a local switch is performed on the service #B".

Optionally, after the second terminal device receives the third indication information, the method 300 further includes: The second terminal device sends address information of the second terminal device to the first terminal device.

For the address information of the second terminal device, refer to the foregoing related descriptions. Details are not described again.

Specifically, after receiving the third indication information, the second terminal device may learn, based on the third indication information, that when the data of the service #B is communicated in the Uu interface communication mode, the application server of the service #B is not passed through (or the local switch is performed on the service #B). Further, the second terminal device may send the address information of the second terminal device to the first terminal device.

Optionally, that the first terminal device sends the third indication information to the second terminal device includes: When the first terminal device learns that the application server of the service #B is not passed through when the data of the service #B is communicated in the Uu interface communication mode (or when the first terminal device learns that the local switch is performed on the service #B), the first terminal device sends the third indication information to the second terminal device.

In a possible implementation, the first terminal device learns, from a network side (for example, the PCF or the application server) or local preconfigured information, that the local switch is allowed to be performed on the service #B. Specifically, if the first terminal device learns, from the network side (for example, the PCF or the application server) or the local preconfigured information, that the local switch is allowed to be performed on the service #B, the first terminal device may send the third indication information to the second terminal device.

It should be noted that the foregoing is merely an example for description, and this application is not limited thereto. For example, when the first terminal device fails to obtain an address of the application server corresponding to the service #B, the first terminal device may also send the third indication information to the second terminal device.

Optionally, in another implementation scenario of the foregoing embodiment, the method 300 further includes: The first terminal device sends address information of the first terminal device to the second terminal device.

The address information of the first terminal device may be used to transmit data of the service #B between the first terminal device and the second terminal device in the Uu interface communication mode. Specifically, the address information of the first terminal device may include an IP address and a port number of the first terminal device.

Optionally, after the second terminal device receives the address information of the first terminal device from the first terminal device, the method 300 further includes: The second terminal device sends address information of the second terminal device to the first terminal device.

Specifically, after receiving the address information of the first terminal device, the second terminal device learns that the local switch is performed on the service #B. Further, the second terminal device may send the address information of the second terminal device to the first terminal device. For the address information of the second terminal device, refer to the foregoing related descriptions. Details are not described again.

Optionally, that the first terminal device sends the address information of the first terminal device to the second terminal device includes: When the first terminal device learns that the application server of the service #B is not passed through when the data of the service #B is communicated in the Uu interface communication mode (or the local switch is performed on the service #B), the first terminal device sends the address information of the first terminal device to the second terminal device.

For a manner in which the first terminal device learns that the application server of the service #B is not passed through when the data of the service #B is communicated in the Uu interface communication mode, refer to the foregoing related descriptions. Details are not described again.

It should be noted that, after receiving the second message from the second terminal device, the first terminal device may send the address information of the first terminal device to the second terminal device. Alternatively, before receiving the second message from the second terminal device, the first terminal device may send the address information of the first terminal device to the second terminal device. For example, the first message sent by the first terminal device to the second terminal device carries the address information of the first terminal device.

It may be understood that the foregoing examples are merely examples for description, and this application is not limited thereto.

Optionally, in another implementation scenario of the foregoing embodiment, the method 300 further includes: The first terminal device establishes a Uu communication path.

The Uu communication path is used to transmit data of the service #B in the Uu interface communication mode.

In an example, that the first terminal device establishes a Uu communication path for the service #B includes: The first terminal device associates the service #B with a PDU session, and then transmits the data of the service #B by using the PDU session. Specifically, the first terminal device may associate the service #B with the PDU session by using a PDU session establishment procedure or a PDU session modification procedure, and then communicate the service #B by using address information corresponding to the PDU session.

In another example, that the first terminal device establishes a Uu communication path for the service #B includes: The first terminal device associates the service #B with a QoS flow in a PDU session, and then transmits the data of the service #B by using the QoS flow in the PDU session. Specifically, the first terminal device may associate the service #B with an existing QoS flow in the PDU session or establish a new QoS flow by using a PDU session modification procedure, and then communicate the data of the service #B by using the QoS flow in the PDU session.

It may be understood that the foregoing examples in which the first terminal device establishes the Uu communication path for the service #B are merely for ease of understanding. This application is not limited thereto.

It should be noted that the first terminal device may establish the Uu communication path after receiving the second message, or may establish the Uu communication path before receiving the second message. This is not limited.

Optionally, in another implementation scenario of the foregoing embodiment, the method 300 further includes: The first terminal device switches the service #B from the PC5 interface communication mode to the Uu interface communication mode based on the second message.

In an example, before receiving the second message, the first terminal device transmits the data of the service #B by using the Uu communication path. The Uu communication path may be established by the first terminal device for the service #B before the first message is sent.

In another example, after receiving the second message, the first terminal device establishes the Uu communication path for the service #B, and transmits the data of the service #B by using the Uu communication path.

Optionally, in another implementation scenario of the foregoing embodiment, after S302, the method 300 further includes: The first terminal device sends a third message to the second terminal device. Therefore, the first terminal device may send, to the second terminal device, a message used to trigger switching of the first service from the PC5 interface communication mode to the Uu interface communication mode, so that the second terminal device switches the service #B from the PC5 interface communication mode to the Uu interface communication mode.

The third message may be used to trigger the second terminal device to switch the service #B from the PC5 interface communication mode to the Uu interface communication mode.

For example, the third message may be a link modification request message, a path switch request message, a path switch confirm message, a communication mode switch request message, or a communication mode switch confirm message. This is not limited.

Further, the method 300 may include: The second terminal device switches the service #B from the PC5 interface communication mode to the Uu interface communication mode based on the third message.

Specifically, the second terminal device receives the third message from the first terminal device, and the second terminal device switches the service #B from the PC5 interface communication mode to the Uu interface communication mode based on the third message.

For switching, by the second terminal device, the service #B from the PC5 interface communication mode to the Uu interface communication mode, refer to the foregoing descriptions of switching, by the first terminal device, the service #B from the PC5 interface communication mode to the Uu interface communication mode. Details are not described herein again.

For ease of understanding, the following describes embodiments of this application by using examples with reference to FIG. 4 to FIG. 6. In the following examples, it is assumed that the service #B is switched from the PC5 interface communication mode to the Uu interface communication mode, the first terminal device is UE 1, and the second terminal device is UE 2. For details about related steps, refer to the foregoing descriptions.

FIG. 4 is a schematic flowchart of a communication mode switching method 400 according to an embodiment of this application. The method 400 may include the following steps.

S401: The UE 1 obtains a path switching policy #1, and the UE 2 obtains a path switching policy #2.

Specifically, the UE 1 may obtain the path switching policy #1 from a PCF or an application server, and the UE 2 may obtain the path switching policy #2 from the PCF or the application server.

In a possible manner, the PCF or the application server separately sends the path switching policies to the UE 1 and the UE 2. In another possible manner, the UE 1 and the UE 2 obtain the path switching policies from the PCF in a registration procedure. This is not limited herein.

For the path switching policy, refer to the foregoing related descriptions. Details are not described herein again.

S402: A PC5 connection is established between the UE 1 and the UE 2.

After the PC5 connection is established between the UE 1 and the UE 2, communication may be performed based on the established PC5 connection. For example, data of one or more services is communicated between the UE 1 and the UE 2 in a PC5 interface communication mode by using the established PC5 connection.

For a specific procedure of establishing the PC5 connection between the UE 1 and the UE 2, refer to descriptions in the conventional technology. This is not limited.

S403: The UE 1 sends a first message to the UE 2 based on the path switching policy #1.

The first message may be used to request to switch a service #A between the UE 1 and the UE 2 from the PC5 interface communication mode to a Uu interface communication mode. For details, refer to the foregoing related descriptions. Details are not described again.

The UE 1 may send the first message to the UE 2 based on the path switching policy #1 in the following several manners.

In a first manner, the UE 1 sends the first message to the UE 2 based on the path switching policy #1.

For example, if the path switching policy #1 includes information about a service for which switching of a communication mode is allowed, and the service for which switching of the communication mode is allowed includes the service #A, the UE 1 sends the first message to the UE 2. For another example, if the path switching policy #1 includes information about a service for which switching of a communication mode is prohibited, and the service for which switching of the communication mode is prohibited does not include the service #A, the UE 1 sends the first message to the UE 2. For details, refer to the related descriptions in Manner 4.

The service #A may be all services communicated between the UE 1 and the UE 2 in the PC5 interface communication mode, or may be some services communicated in the PC5 interface communication mode, namely, one or more services communicated in the PC5 interface communication mode.

Specifically, when the service #A is all the services communicated between the UE 1 and the UE 2 in the PC5 interface communication mode, the first message may carry first indication information. To be specific, the UE 1 may include the first indication information in the first message and send the first message to the UE 2, to request to switch all the services communicated in the PC5 interface communication mode from the PC5 interface communication mode to the Uu interface communication mode. When the service #A is some services communicated between the UE 1 and the UE 2 in the PC5 interface communication mode, the first message may carry identification information of the service #A and first indication information. To be specific, the UE 1 may include the identification information of the service #A and the first indication information in the first message and send the first message to the UE 2, to request to switch the service #A from the PC5 interface communication mode to the Uu interface communication mode.

For the first indication information and the identification information of the service #A, refer to the foregoing related descriptions. Details are not described herein again.

In a second manner, the UE 1 sends the first message to the UE 2 based on the path switching policy #1 and a QoS requirement of a QoS flow corresponding to the service #A.

The QoS flow corresponding to the service #A may be one or more PC5 QoS flows, namely, a QoS flow corresponding to data of the service #A when the data of the service #A is communicated in the PC5 interface communication mode.

In other words, the service #A may be all services carried on the QoS flow corresponding to the service #A, or may be some services carried on the QoS flow corresponding to the service #A, namely, one or more services carried on the QoS flow.

For example, when the path switching policy #1 includes information about a service for which switching of a communication mode is allowed, and the service for which switching of the communication mode is allowed includes the service #A, if the QoS requirement of the QoS flow corresponding to the service #A is not met, the UE 1 sends the first message to the UE 2. For another example, when the path switching policy #1 includes information about a service for which switching of a communication mode is prohibited, and the service for which switching of the communication mode is prohibited does not include the service #A, if the QoS requirement of the QoS flow corresponding to the service #A is not met, the UE 1 sends the first message to the UE 2. For details, refer to the related descriptions in Manner 5.

It is assumed that the service #A is all services carried on a QoS flow 1. In this case, the first message may carry an identifier of the QoS flow 1. To be specific, the UE 1 may include the identifier of the QoS flow 1 in the first message and send the first message to the UE 2, to request to switch all the services carried on the QoS flow 1 from the PC5 interface communication mode to the Uu interface communication mode. Alternatively, it is assumed that the service #A is all services carried on a QoS flow 1 and a QoS flow 2. In this case, the first message may carry an identifier of the QoS flow 1 and an identifier of the QoS flow 2. To be specific, the UE 1 may include the identifier of the QoS flow 1 and the identifier of the QoS flow 2 in the first message, and send the first message to the UE 2, to request to switch all services carried on the QoS flow 1 and all services carried on the QoS flow 2 from the PC5 interface communication mode to the Uu interface communication mode.

In addition, the first message may further carry first indication information. Specifically, for the first indication information, refer to the foregoing related descriptions. Details are not described herein again.

It should be noted that a sequence of a determining condition based on the path switching policy #1 and a determining condition based on the QoS requirement of the QoS flow corresponding to the service #A may be adjusted. For example, when the QoS requirement of the QoS flow corresponding to the service #A is not met, if the service for which switching of the communication mode is allowed includes the service #A, the UE 1 sends the first message to the UE 2.

In a third manner, the UE 1 sends the first message to the UE 2 based on the path switching policy #1 and signal quality of transmitting data of the service #A by the UE 1 in the PC5 interface communication mode.

For example, when the path switching policy #1 includes information about a service for which switching of a communication mode is allowed, and the service for which switching of the communication mode is allowed includes the service #A, if the signal quality of transmitting the data of the service #A by the UE 1 in the PC5 interface communication mode is less than a first signal quality threshold, the UE 1 sends the first message to the UE 2. For another example, when the path switching policy #1 includes information about a service for which switching of a communication mode is prohibited, and the service for which switching of the communication mode is prohibited does not include the service #A, if the signal quality of transmitting the data of the service #A by the UE 1 in the PC5 interface communication mode is less than a first signal quality threshold, the UE 1 sends the first message to the UE 2 For details, refer to the related descriptions in Manner 6.

The service #A may be all services communicated between the UE 1 and the UE 2 in the PC5 interface communication mode, or may be some services communicated in the PC5 interface communication mode, namely, one or more services communicated in the PC5 interface communication mode.

Specifically, when the service #A is all the services communicated between the UE 1 and the UE 2 in the PC5 interface communication mode, the first message may carry first indication information. To be specific, the UE 1 may include the first indication information in the first message and send the first message to the UE 2, to request to switch all the services communicated in the PC5 interface communication mode from the PC5 interface communication mode to the Uu interface communication mode. Specifically, for the first indication information, refer to the foregoing related descriptions. Details are not described herein again.

It should be noted that a sequence of a determining condition based on the path switching policy #1 and a determining condition based on the signal quality of transmitting the data of the service #A by the UE 1 in the PC5 interface communication mode may be adjusted. For example, when the signal quality of transmitting the data of the service #A by the UE 1 in the PC5 interface communication mode is less than the first signal quality threshold, if in the path switching policy #1, the service for which switching of the communication mode is allowed includes the service #A, the UE 1 sends the first message to the UE 2.

It should be understood that the foregoing is an example for description, and this application is not limited thereto.

Optionally, the first message carries a first QoS parameter and/or a second QoS parameter. For the first QoS parameter and the second QoS parameter, refer to the foregoing related descriptions. Details are not described again.

Optionally, before step S403, the method 400 further includes: The UE 1 determines the first QoS parameter and/or the second QoS parameter based on a third QoS parameter. For details, refer to the foregoing related descriptions. Details are not described again.

S404: The UE 2 sends a second message to the UE 1 based on the first message.

The second message may be used to notify (or represent, or indicate) that switching of a service #B from the PC5 interface communication mode to the Uu interface communication mode is accepted (or allowed, or agreed), and the service #A includes the service #B.

Specifically, for related terms such as the second message, the service #A, and the service #B, refer to the foregoing related descriptions. Details are not described again.

Specifically, the service #B may be the same as the service #A, or may be different from the service #A. When the service #B is the same as the service #A, the second message may be an ACK message of the first message, and the ACK message may indicate that the UE 2 accepts switching of the service #A from the PC5 interface communication mode to the Uu interface communication mode. When the service #B is different from the service #A, the second message may carry identification information of the service #B, and the identification information of the service #B is used by the UE 1 to identify the service #B.

Optionally, before step S404, the method 400 further includes: The UE 2 determines, based on to the path switching policy #2 and/or signal quality of a Uu interface of the UE 2, to accept switching of the service #B from the PC5 interface communication mode to the Uu interface communication mode.

For the signal quality of the Uu interface of the UE 2, refer to the foregoing related descriptions. Details are not described herein again.

The UE 2 may determine, based on the path switching policy #2 and/or the signal quality of the Uu interface of the UE 2, to accept switching of the service #B from the PC5 interface communication mode to the Uu interface communication mode in the following several manners.

In a first manner, the UE 2 determines, based on the path switching policy #2, to accept switching of the service #B from the PC5 interface communication mode to the Uu interface communication mode.

For example, if the path switching policy #2 includes information about a service for which switching of a communication mode is allowed, and the service for which switching of the communication mode is allowed includes the service #B, the UE 2 determines to accept switching of the service #B from the PC5 interface communication mode to the Uu interface communication mode. For another example, if the path switching policy #2 includes information about a service for which switching of a communication mode is prohibited, and the service for which switching of the communication mode is prohibited does not include the service #B, the UE 2 determines to accept switching of the service #B from the PC5 interface communication mode to the Uu interface communication mode. For details, refer to the related descriptions in the implementation 3.

In a second manner, the UE 2 determines, based on the signal quality of the Uu interface of the UE 2, to accept switching of the service #B from the PC5 interface communication mode to the Uu interface communication mode.

For example, when the signal quality of the Uu interface of the UE 2 meets a QoS requirement of the service #B, the UE 2 determines to accept switching of the service #B from the PC5 interface communication mode to the Uu interface communication mode. For another example, when the signal quality of the Uu interface of the UE 2 is greater than or equal to a second signal quality threshold, the UE 2 determines to accept switching of the service #B from the PC5 interface communication mode to the Uu interface communication mode. For details, refer to the related descriptions in the implementation 1.

In a third manner, the UE 2 determines, based on the path switching policy #2 and the signal quality of the Uu interface of the UE 2, to accept switching of the service #B from the PC5 interface communication mode to the Uu interface communication mode.

For example, when the path switching policy #2 includes information about a service for which switching of a communication mode is allowed, and the service for which switching of the communication mode is allowed includes the service #B, if the signal quality of the Uu interface of the UE 2 meets a QoS requirement of the service #B, the UE 2 determines to accept switching of the service #B from the PC5 interface communication mode to the Uu interface communication mode. For another example, when the path switching policy #2 includes information about a service for which switching of a communication mode is allowed, and the service for which switching of the communication mode is allowed includes the service #B, if the signal quality of the Uu interface of the UE 2 is greater than or equal to a second signal quality threshold, the UE 2 determines to accept switching of the service #B from the PC5 interface communication mode to the Uu interface communication mode. For another example, when the path switching policy #2 includes information about a service for which switching of a communication mode is prohibited, and the service for which switching of the communication mode is prohibited does not include the service #B, if the signal quality of the Uu interface of the UE 2 meets a QoS requirement of the service #B, the UE 2 determines to accept switching of the service #B from the PC5 interface communication mode to the Uu interface communication mode. For details, refer to the related descriptions in the implementation 4.

It should be noted that a sequence of a determining condition based on the path switching policy #2 and a determining condition based on the signal quality of the Uu interface of the UE 2 may be adjusted. For example, when the signal quality of the Uu interface of the UE 2 meets the QoS requirement of the service #B, if in the path switching policy #2, the service for which switching of the communication mode is allowed includes the service #B, the UE 2 determines to accept switching of the service #B from the PC5 interface communication mode to the Uu interface communication mode.

It should be understood that the foregoing is merely an example for description, and this application is not limited thereto.

Optionally, if the first message carries the first QoS parameter in step S403, the method 400 further includes: The UE 2 determines the second QoS parameter based on the first QoS parameter.

For determining, by the UE 2, the second QoS parameter based on the first QoS parameter, refer to the foregoing related descriptions. Details are not described again.

Optionally, if the first message carries the second QoS parameter in step S403, the method 400 further includes: The UE 2 sends a second request message to a core network (for example, the PCF or an AIVIF), where the second request message is used to request to authorize using of the second QoS parameter when data of the service #B is communicated in the Uu interface communication mode. Further, the method 400 may further include: The core network sends a response to the second request message to the UE 2. In an example, the response to the second request message is used to acknowledge that the UE 2 is authorized to use the second QoS parameter when the data of the service #B is communicated in the Uu interface communication mode. In another example, the response to the second request message includes a QoS parameter that is authorized by the core network to be used when the UE 2 transmits the data of the service #B in the Uu interface communication mode. For details, refer to the foregoing related descriptions.

It should be understood that the foregoing is merely an example for description, and this application is not limited thereto.

S405: The UE 1 establishes a Uu communication path for the service #B.

For establishment of the Uu communication path for the service #B, refer to the foregoing related descriptions. Details are not described again.

In an example, step S405 may be performed before step S404. Specifically, before receiving the second message, the UE 1 establishes the Uu communication path for the service #B.

In another example, step S405 may be performed after step S404. Specifically, after receiving the second message, the UE 1 establishes the Uu communication path for the service #B.

S406: The UE 2 establishes a Uu communication path for the service #B.

For establishment of the Uu communication path for the service #B, refer to the foregoing related descriptions. Details are not described again.

In an example, step S406 may be performed before step S404. Specifically, before sending the second message to the UE 1, the UE 2 establishes the Uu communication path for the service #B.

In another example, step S406 may alternatively be performed after step S404. Specifically, after sending the second message to the UE 1, the UE 2 establishes the Uu communication path for the service #B.

In still another example, the UE 2 establishes the Uu communication path for the service #B based on a third message. The third message is used to trigger the UE 2 to switch the service #B from the PC5 interface communication mode to the Uu interface communication mode. Specifically, before step S406, the method 400 may further include: The UE 1 sends the third message to the UE 2. Correspondingly, the UE 2 receives the third message from the UE 1, and the UE 2 establishes the Uu communication path for the service #B based on the third message. For details, refer to the foregoing related descriptions.

S407: The data of the service #B is communicated between the UE 1 and the UE 2 in the Uu interface communication mode.

After step S405 and step S406 are performed, the data of the service #B may be communicated between the UE 1 and the UE 2 in the Uu interface communication mode.

Optionally, if the service #B is all services communicated between the UE 1 and the UE 2 in the PC5 interface communication mode, the UE 1 and the UE 2 may release the PC5 connection.

Based on the foregoing solution, the UE 1 may determine, based on the path switching policy, to switch the at least one service from the PC5 interface communication mode to the Uu interface communication mode. Therefore, the UE 1 sends the first message to the UE 2. The UE 2 sends the second message to the UE 1 based on the first message. In addition, the UE 2 may determine, based on the path switching policy and/or the signal quality of the Uu interface of the UE 2, to accept switching of one or more services from the PC5 interface communication mode to the Uu interface communication mode. Therefore, the UE 2 sends the second message to the UE 1. Through negotiation between the UE 1 and the UE 2, one or more services can be switched from the PC5 interface communication mode to the Uu interface communication mode. In this way, it is avoided that data of the services is communicated in a fixed communication mode, and a communication requirement of the one or more services can be dynamically met. In addition, after separately completing establishment of the Uu communication paths, the UE 1 and the UE 2 communicate the data of the service #B in the Uu interface communication mode, so that switching from the PC5 interface communication mode to the Uu interface communication mode may be completed by using a make before break mechanism, thereby reducing service interruption as much as possible.

It should be noted that the method 400 may be applied to a scenario in which the service #B is switched from the PC5 interface communication mode to the Uu interface communication mode, and the UE 1 and the UE 2 communicate with each other through the application server when transmitting the data of the service #B in the Uu interface communication mode. With reference to FIG. 5, the following describes a method applicable to a scenario in which a service #B is switched from a PC5 interface communication mode to a Uu interface communication mode, and UE 1 and UE 2 communicate with each other without through an application server when transmitting data of the service #B in the Uu interface communication mode.

FIG. 5 is a schematic flowchart of another communication mode switching method 500 according to an embodiment of this application. The method 500 may include the following steps.

S501: The UE 1 obtains a path switching policy #1, and the UE 2 obtains a path switching policy #2.

S502: A PC5 connection is established between the UE 1 and the UE 2.

Steps S501 and S502 are similar to steps S401 and S402, and details are not described herein again.

S503: The UE 1 sends a first message to the UE 2 based on the path switching policy #1.

For details about step S503, refer to the implementations in step S403. Details are not described again.

It should be noted that a difference between S503 and step S403 lies in that the first message in step S503 may carry second indication information, and the second indication information represents that when data of a service #A is communicated in the Uu interface communication mode, an application server corresponding to the service #A is not passing through.

Specifically, when the UE 1 learns that the data of the service #A is allowed to not pass through the application server of the service #A when being communicated in the Uu interface communication mode (or when the UE 1 learns that a local switch is allowed to be performed on the service #A), the first message sent by the UE 1 to the UE 2 carries the second indication information. For details, refer to the foregoing related descriptions. Details are not described again.

S504: The UE 2 sends a second message to the UE 1 based on the first message.

For details about step S504, refer to the implementations in step S404. Details are not described again.

It should be noted that a difference between step S503 and step S404 lies in that the second message in step S504 may carry address information of the UE 2.

Specifically, when the UE 2 learns that an application server of the service #B is not passed through when the data of the service #B is communicated in the Uu interface communication mode (or when the UE 2 learns that a local switch is performed on the service #B), the second message sent by the UE 2 to the UE 1 carries the address information of the UE 2. For example, the UE 2 learns, based on the second indication information received in step S503, that the application server of the service #B is not passed through when the data of the service #B is communicated in the Uu interface communication mode. In this case, the second message sent by the UE 2 to the UE 1 carries the address information of the UE 2. For details, refer to the descriptions in the method 300. Details are not described herein again.

S505: The UE 1 establishes a Uu communication path for the service #B.

S506: The UE 2 establishes a Uu communication path for the service #B.

Steps S505 and S506 are similar to steps S405 and S406, and details are not described herein again.

S507: The UE 1 sends address information of the UE 1 to the UE 2.

The address information of the UE 1 is used to transmit data of the service #B between the UE 1 and the UE 2 in the Uu interface communication mode.

In a possible implementation, when the UE 1 learns that the data of the service #B is allowed to not pass through the application server of the service #B when being communicated in the Uu interface communication mode (or when the UE 1 learns that the local switch is allowed to be performed on the service #B), the UE 1 sends the address information of the UE 1 to the UE 2.

For a method in which the UE 1 learns that the data of the service #B is allowed to not pass through the application server of the service #B when being communicated in the Uu interface communication mode, refer to the foregoing related descriptions. Details are not described herein again.

In another possible implementation, after receiving the address information of the UE 2, the UE 1 sends the address information of the UE 1 to the UE 2.

S508: The UE 2 sends the address information of the UE 2 to the UE 1.

The address information of the UE 2 is used to transmit data of the service #B between the UE 1 and the UE 2 in the Uu interface communication mode.

The UE 2 may send the address information of the UE 2 to the UE 1 in the following several manners.

In a first manner, the UE 2 sends the address information of the UE 2 to the UE 1 based on the second indication information.

Specifically, the first message carries the second indication information in step S503. After receiving the first message, the UE 2 learns, based on the second indication information carried in the first message, that the application server of the service #A is not passed through when the data of the service #A is communicated in the Uu interface communication mode (or the local switch is performed on the service #A). In this case, the UE 2 may send the address information of the UE 2 to the UE 1.

In a second manner, the UE 2 sends the address information of the UE 2 to the UE 1 based on third indication information.

Specifically, after the UE 2 receives the address information of the UE 1 from the UE 1, the UE 2 learns that local switch is performed on the service #B. Further, the UE 2 may send the address information of the UE 2 to the UE 1.

Specifically, after step S504 and before step S508, the method 500 may further include: The UE 1 sends the third indication information to the UE 2. The third indication information represents that when the data of the service #B is communicated in the Uu interface communication mode, the application server corresponding to the service #B is not passed through. After receiving the third indication information, the UE 2 learns, based on the third indication information, that the application server of the service #B is not passed through when the data of the service #B is communicated in the Uu interface communication mode (or the local switch is performed on the service #B). In this case, the UE 2 may send the address information of the UE 2 to the UE 1.

In a third manner, the UE 2 sends the address information of the UE 2 to the UE 1 based on the address information of the UE 1.

For example, after receiving the address information of the UE 1, the UE 2 sends the address information of the UE 2 to the UE 1.

In a fourth manner, the UE 2 learns that the local switch is allowed to be performed on the service #B, and sends the address information of the UE 2 to the UE 1.

For example, the UE 2 may alternatively send the address information of the UE 2 to the UE 1 after learning, from a network side (for example, the PCF or the application server) or local preconfigured information, that the local switch is allowed to be performed on the service #B. In this case, a sequence of step S508 and step S507 may be adjusted.

Specifically, the UE 2 learns, from the network side (for example, the PCF or the application server) or the local preconfigured information, that the local switch is allowed to be performed on the service #B. In this case, the UE 2 sends the address information of the UE 2 to the UE 1. After receiving the address information of the UE 2 from the UE 2, the UE 1 learns that the local switch is performed on the service #B. Further, the UE 1 sends the address information of the UE 1 to the UE 2.

It should be understood that the foregoing is merely an example for description, and this application is not limited thereto.

S509: The data of the service #B is communicated between the UE 1 and the UE 2 in the Uu interface communication mode.

Optionally, if the service #B is all services communicated between the UE 1 and the UE 2 in the PC5 interface communication mode, the UE 1 and the UE 2 may release the PC5 connection.

Based on the foregoing solution, the UE 1 may determine, based on the path switching policy, to switch the at least one service from the PC5 interface communication mode to the Uu interface communication mode. Therefore, the UE 1 sends the first message to the UE 2. The UE 2 sends the second message to the UE 1 based on the first message. In addition, the UE 2 may determine, based on the path switching policy and/or the signal quality of the Uu interface of the UE 2, to accept switching of one or more services from the PC5 interface communication mode to the Uu interface communication mode. Therefore, the UE 2 sends the second message to the UE 1. Through negotiation between the UE 1 and the UE 2, one or more services can be switched from the PC5 interface communication mode to the Uu interface communication mode. In this way, it is avoided that data of the services is communicated in a fixed communication mode, and a communication requirement of the one or more services can be dynamically met. In addition, after separately completing establishment of the Uu communication paths, the UE 1 and the UE 2 communicate the data of the service #B in the Uu interface communication mode, so that switching from the PC5 interface communication mode to the Uu interface communication mode may be completed by using a make before break mechanism, thereby reducing service interruption as much as possible. In addition, the UE 1 sends the address information of the UE 1 to the UE 2, and the UE 2 sends the address information of the UE 2 to the UE 1, so that the UE 1 and the UE 2 may communicate the data of the service #B in the Uu interface communication mode without participation of the application server.

FIG. 6 is a schematic flowchart of still another communication mode switching method 600 according to an embodiment of this application. The method 600 may include the following steps.

S601: UE 1 receives a fourth message.

Specifically, the UE 1 may receive the fourth message from a PCF or an application server.

The fourth message may indicate (or notify) that a path selection policy changes. It is assumed that a path preference of a service #A changes, for example, from PC5 preferred to Uu preferred. In this case, the PCF or the application server sends the fourth message, to notify the UE 1 that the path selection policy changes.

In a first example, the fourth message includes information about a service for which a PC5 interface communication mode is preferably used after the path selection policy changes, and the service for which the PC5 interface communication mode is preferably used does not include the service #A. Specifically, after the path preference of the service #A changes from the PC5 preferred to the Uu preferred, the PCF or the application server sends the fourth message to the UE 1, where the fourth message may indicate that the service for which the PC5 interface communication mode is preferably used does not include the service #A.

In a second example, the fourth message includes information about a service for which a Uu interface communication mode is preferably used after the path selection policy changes, and the service for which the Uu interface communication mode is preferably used includes the service #A. Specifically, after the path preference of the service #A changes from the PC5 preferred to the Uu preferred, the PCF or the application server sends the fourth message to the UE 1, where the fourth message indicates that the service for which the Uu interface communication mode is preferably used includes the service #A.

In a third example, the fourth message carries fourth indication information, and the fourth indication information represents (or indicates) that the path preference of the service #A changes. The fourth indication information may be implemented by using one or more bits. For example, one bit is used to indicate whether the path preference of the service #A changes. For example, if the bit is set to "1", it indicates that the path preference of the service #A changes; or if the bit is set to "0", it indicates that the path preference of the service #A does not change.

Optionally, the fourth message carries information #3, and the information #3 is used by the UE 1 to identify the service #A. Specifically, for the information #3, refer to the related descriptions of the information #1 in the embodiment shown in FIG. 3. Details are not described again.

If the data of the service #A is being communicated between the UE 1 and the UE 2 in the PC5 interface communication mode, the method 600 may further include the following steps.

S602: The UE 1 sends a first message to the UE 2 based on the fourth message.

The first message may be used to request to switch a service #A between the UE 1 and the UE 2 from the PC5 interface communication mode to a Uu interface communication mode.

The first example in step S601 is used as an example. After receiving the fourth message from the PCF or the application server, the UE 1 learns that the service for which the PC5 interface communication mode is preferably used does not include the service #A. In this case, the UE 1 may request, by using the first message, to switch the service #A from the PC5 interface communication mode to the Uu interface communication mode.

The second example in step S602 is used as an example. After receiving the fourth message from the PCF or the application server, the UE 1 learns that the service for which the Uu interface communication mode is preferably used includes the service #A. In this case, the UE 1 may request, by using the first message, to switch the service #A from the PC5 interface communication mode to the Uu interface communication mode.

The third example in step S602 is used as an example. After receiving the fourth message from the PCF or the application server, the UE 1 learns that the path preference of the service #A changes. In this case, the UE 1 may request, by using the first message, to switch the service #A from the PC5 interface communication mode to the Uu interface communication mode.

S603: The UE 2 sends a second message to the UE 1 based on the first message.

The second message may be used to notify (or represent) that switching of the service #B from the PC5 interface communication mode to the Uu interface communication mode is accepted (or allowed, or agreed), and the service #A includes the service #B.

For step S602 and step S603, refer to the descriptions in the method 300 or the methods 400 and 500. Details are not described herein again.

Based on the foregoing solution, when the path selection policy changes, the UE 1 sends the first message to the UE 2, to request to switch one or more services from the PC5 interface communication mode to the Uu interface communication mode. This avoids transmitting data of the services in a communication mode determined before the path selection policy changes, so that a communication requirement of the one or more services can be dynamically met.

It may be understood that the examples in FIG. 4 to FIG. 6 in embodiments of this application are merely intended to help a person skilled in the art understand embodiments of this application, but are not intended to limit embodiments of this application to specific scenarios in the examples. A person skilled in the art can definitely make various equivalent modifications or changes based on the examples shown in FIG. 4 to FIG. 6, and such modifications or changes also fall within the scope of embodiments of this application.

It may be further understood that some optional features in embodiments of this application may not depend on another feature in some scenarios, or may be combined with another feature in some scenarios. This is not limited.

It may be further understood that the solutions in embodiments of this application may be appropriately combined for use, and explanations or descriptions of terms in embodiments may be mutually referenced or explained in the embodiments. This is not limited.

It may be further understood that values of various numeric sequence numbers in embodiments of this application do not mean execution sequences, are merely for differentiation for ease of description, and should not constitute any limitation on an implementation process of embodiments of this application.

It may be further understood that some message names, such as a path switch requirement message or a path switch request message, are included in embodiments of this application. It should be understood that the names of the messages do not limit the protection scope of embodiments of this application.

It may be further understood that in the method embodiments, the method and the operations implemented by the terminal device may be implemented by a component (for example, a chip or a circuit) of the terminal device. In addition, the method and the operations implemented by the network device may be implemented by a component (for example, a chip or a circuit) of the network device. This is not limited.

Corresponding to the methods provided in the method embodiments, an embodiment of this application further provides a corresponding apparatus. The apparatus includes a corresponding module configured to perform the method embodiments. The module may be software, hardware, or a combination of software and hardware. It may be understood that the technical features described in the method embodiments are also applicable to the following apparatus embodiments.

FIG. 7 is a schematic block diagram of a communication mode switching apparatus according to an embodiment of this application. The apparatus 700 includes a transceiver unit 710, and the transceiver unit 710 may be configured to implement a corresponding communication function. The transceiver unit 710 may also be referred to as a communication interface or a communication unit.

Optionally, the apparatus 700 may further include a processing unit 720, and the processing unit 720 may be configured to perform data processing.

Optionally, the apparatus 700 further includes a storage unit. The storage unit may be configured to store instructions and/or data. The processing unit 720 may read the instructions and/or the data in the storage unit, so that the apparatus implements actions of different terminal devices in the method embodiments, for example, actions of the first terminal device, the second terminal device, the UE 1, or the UE 2.

The apparatus 700 may be configured to perform an action performed by the terminal device in the method embodiments. In this case, the apparatus 700 may be the terminal device or a component of the terminal device. The transceiver unit 710 is configured to perform receiving and sending-related operations on the terminal device side in the method embodiments. The processing unit 720 is configured to perform processing-related operations on the terminal device side in the method embodiments.

In a design, the apparatus 700 is configured to perform an action performed by the first terminal device in the method embodiments.

In a possible implementation, the transceiver unit 710 is configured to send a first message to the second terminal device, where the first message is used to request to switch at least one service between the first terminal device and the second terminal device from a proximity-based services communication 5 PC5 interface communication mode to a Uu interface communication mode. The transceiver unit 710 is further configured to receive a second message from the second terminal device, where the second message is used to notify that switching of a first service from the PC5 interface communication mode to the Uu interface communication mode is accepted, and the at least one service includes the first service.

Optionally, the processing unit 720 is configured to switch the first service from the PC5 interface communication mode to the Uu interface communication mode based on the second message.

Optionally, the first message carries identification information of the at least one service, or the first message carries identification information of a PC5 quality of service QoS flow corresponding to the at least one service.

Optionally, the first message further carries first indication information, and the first indication information represents that the at least one service is switched from the PC5 interface communication mode to the Uu interface communication mode.

Optionally, the transceiver unit 710 is specifically configured to send the first message to the second terminal device based on first reference information, where the first reference information includes one or more of the following information: a path selection policy, a path switching policy, a QoS requirement of the PC5 QoS flow corresponding to the at least one service, and signal quality of transmitting the data of the at least one service by the first terminal device in the PC5 interface communication mode.

Optionally, the transceiver unit 710 is specifically configured to: when the QoS requirement of the PC5 QoS flow corresponding to the at least one service is not met, send the first message to the second terminal device; or when the signal quality of transmitting the data of the at least one service in the PC5 interface communication mode is less than a first signal quality threshold, send the first message to the second terminal device; or when the path selection policy includes information about a service for which the Uu interface communication mode is preferably used, and the service for which the Uu interface communication mode is preferably used includes the at least one service, send the first message to the second terminal device; or when the path switching policy includes information about a service for which switching of a communication mode is allowed, and the service for which switching of the communication mode is allowed includes the at least one service, if the QoS requirement of the PC5 QoS flow corresponding to the at least one service is not met, or the signal quality of transmitting the data of the at least one service in the PC5 interface communication mode is less than a first signal quality threshold, send the first message to the second terminal device; or when the path switching policy includes information about a service for which switching of a communication mode is prohibited, and the service for which switching of the communication mode is prohibited does not include the at least one service, if the QoS requirement of the PC5 QoS flow corresponding to the at least one service is not met, or the signal quality of transmitting the data of the at least one service in the PC5 interface communication mode is less than a first signal quality threshold, send the first message to the second terminal device.

Optionally, the transceiver unit 710 is further configured to send a first QoS parameter to the second terminal device, where the first QoS parameter is used by the first terminal device to transmit data of the first service in the Uu interface communication mode.

Optionally, the processing unit 720 is further configured to determine the first QoS parameter based on a third QoS parameter, where the third QoS parameter is used by the first terminal device to transmit data of the first service in the PC5 interface communication mode.

Optionally, the transceiver unit 710 is further configured to receive a second QoS parameter from the second terminal device, where the second QoS parameter is used by the second terminal device to transmit data of the first service in the Uu interface communication mode; and the processing unit 720 is further configured to determine the first QoS parameter based on the second QoS parameter, where the first QoS parameter is used by the first terminal device to transmit data of the first service in the Uu interface communication mode.

Optionally, the transceiver unit 710 is further configured to send a second QoS parameter to the second terminal device, where the second QoS parameter is used by the second terminal device to transmit data of the first service in the Uu interface communication mode.

Optionally, the processing unit 720 is further configured to determine the second QoS parameter based on a third QoS parameter, where the third QoS parameter is used by the first terminal device to transmit data of the first service in the PC5 interface communication mode.

Optionally, the first message carries second indication information, and the second indication information represents that when the data of the at least one service is communicated in the Uu interface communication mode, an application server corresponding to the at least one service is not passed through.

Optionally, after the first terminal device receives the second message from the second terminal device, the transceiver unit 710 is further configured to send third indication information to the second terminal device, where the third indication information represents that when the data of the first service is communicated in the Uu interface communication mode, an application server corresponding to the first service is not passed through.

Optionally, the transceiver unit 710 is further configured to send address information of the first terminal device to the second terminal device, where the address information of the first terminal device is used to transmit data of the first service between the first terminal device and the second terminal device in the Uu interface communication mode.

Optionally, the transceiver unit 710 is further configured to receive address information of the second terminal device from the second terminal device, where the address information of the second terminal device is used to transmit data of the first service between the first terminal device and the second terminal device in the Uu interface communication mode.

Optionally, the processing unit 720 is further configured to establish a Uu communication path, where the Uu communication path is used to transmit data of the first service in the Uu interface communication mode.

Optionally, after the first terminal device receives the second message from the second terminal device, the transceiver unit 710 is further configured to send a third message to the second terminal device, where the third message is used to trigger the second terminal device to switch the first service from the PC5 interface communication mode to the Uu interface communication mode.

The apparatus 700 may implement the steps or procedures performed by the first terminal device in the method embodiments according to embodiments of this application. The apparatus 700 may include units configured to perform the method performed by the first terminal device in the embodiment shown in FIG. 3, or include units configured to perform the method performed by the UE 1 in any embodiment shown in FIG. 4 to FIG. 6.

It should be understood that a specific process in which the units perform the corresponding steps is described in detail in the method embodiments. For brevity, details are not described herein.

In another design, the apparatus 700 is configured to perform an action performed by the second terminal device in the method embodiments.

In a possible implementation, the transceiver unit 710 is configured to receive a first message from the first terminal device, where the first message is used to request to switch at least one service between the first terminal device and the second terminal device from a proximity-based services communication 5 PC5 interface communication mode to a Uu interface communication mode; and the transceiver unit 710 is further configured to send a second message to the first terminal device based on the first message, where the second message is used to notify that switching of a first service from the PC5 interface communication mode to the Uu interface communication mode is accepted, and the at least one service includes the first service.

Optionally, the processing unit 720 is configured to determine, based on second reference information, to accept switching of the first service from the PC5 interface communication mode to the Uu interface communication mode, where the second reference information includes one or more of the following information: a path selection policy, a path switching policy, and signal quality of a Uu interface of the second terminal device.

Optionally, the processing unit 720 is specifically configured to: when the path selection policy includes information about a service for which the Uu interface communication mode is preferably used, and the service for which the Uu interface communication mode is preferably used includes the first service, determine to accept switching of the first service from the PC5 interface communication mode to the Uu interface communication mode; or when the path switching policy includes information about a service for which switching of a communication mode is allowed, and the service for which switching of the communication mode is allowed includes the first service, determine to accept switching of the first service from the PC5 interface communication mode to the Uu interface communication mode; or when the path switching policy includes information about a service for which switching of a communication mode is prohibited, and the service for which switching of the communication mode is prohibited does not include the first service, determine to accept switching of the first service from the PC5 interface communication mode to the Uu interface communication mode; or when the signal quality of the Uu interface of the second terminal device meets a quality of service QoS requirement of the first service, determine to accept switching of the first service from the PC5 interface communication mode to the Uu interface communication mode; or when the signal quality of the Uu interface of the second terminal device is greater than or equal to a second signal quality threshold, determine, for the terminal device, to accept switching of the first service from the PC5 interface communication mode to the Uu interface communication mode.

Optionally, the first message carries identification information of the at least one service, or the first message carries identification information of a PC5 QoS flow corresponding to the at least one service.

Optionally, the first message carries first indication information, and the first indication information represents that the at least one service is switched from the PC5 interface communication mode to the Uu interface communication mode.

Optionally, the second message carries identification information of the first service, or the second message carries identification information of a PC5 QoS flow corresponding to the first service.

Optionally, the transceiver unit 710 is further configured to send a second QoS parameter to the first terminal device, where the second QoS parameter is used by the second terminal device to transmit data of the first service in the Uu interface communication mode.

Optionally, before the transceiver unit 710 sends the second QoS parameter to the first terminal device, the transceiver unit 710 is further configured to receive a first QoS parameter from the first terminal device, where the first QoS parameter is used by the first terminal device to transmit data of the first service in the Uu interface communication mode; and the processing unit 720 is configured to determine the second QoS parameter based on the first QoS parameter.

Optionally, before the transceiver unit 710 sends the second QoS parameter to the first terminal device, the processing unit 720 is configured to determine the second QoS parameter based on a third QoS parameter, where the third QoS parameter is used by the second terminal device to transmit data of the first service in the PC5 interface communication mode.

Optionally, the transceiver unit 710 is further configured to receive a second QoS parameter from the first terminal device, where the second QoS parameter is used by the second terminal device to transmit data of the first service in the Uu interface communication mode.

Optionally, the first message carries second indication information, and the second indication information represents that when the data of the at least one service is communicated in the Uu interface communication mode, an application server corresponding to the at least one service is not passed through. The transceiver unit 710 is further configured to send address information of the second terminal device to the first terminal device based on the second indication information, where the address information of the second terminal device is used to transmit data of the at least one service between the first terminal device and the second terminal device in the Uu interface communication mode.

Optionally, after the transceiver unit 710 sends the second message to the first terminal device, the transceiver unit 710 is further configured to: receive third indication information from the first terminal device, where the third indication information represents that when the data of the first service is communicated in the Uu interface communication mode, an application server corresponding to the first service is not passed through; and send address information of the second terminal device to the first terminal device based on the third indication information, where the address information of the second terminal device is used to transmit data of the first service between the first terminal device and the second terminal device in the Uu interface communication mode.

Optionally, the transceiver unit 710 is further configured to: receive address information of the first terminal device from the first terminal device, where the address information of the first terminal device is used to transmit data of the first service between the first terminal device and the second terminal device in the Uu interface communication mode; and send address information of the second terminal device to the first terminal device based on the address information of the first terminal device, where the address information of the second terminal device is used to transmit data of the first service between the first terminal device and the second terminal device in the Uu interface communication mode.

Optionally, after the transceiver unit 710 sends the second message to the first terminal device, the transceiver unit 710 is further configured to receive a third message from the first terminal device, where the third message is used to trigger the second terminal device to switch the first service from the PC5 interface communication mode to the Uu interface communication mode; and the processing unit 720 is configured to switch the first service from the PC5 interface communication mode to the Uu interface communication mode based on the third message.

The apparatus 700 may implement the steps or procedures performed by the second terminal device in the method embodiments according to embodiments of this application. The apparatus 700 may include units configured to perform the method performed by the second terminal device in the embodiment shown in FIG. 3, or include units configured to perform the method performed by the UE 2 in any embodiment shown in FIG. 4 to FIG. 6.

It should be understood that a specific process in which the units perform the corresponding steps is described in detail in the method embodiments. For brevity, details are not described herein.

It should be further understood that the apparatus 700 is presented in a form of a functional unit. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 700 may be specifically the first terminal device in the foregoing embodiments, and may be configured to perform the procedures and/or the steps corresponding to the first terminal device in the method embodiments. Alternatively, the apparatus 700 may be specifically the second terminal device in the foregoing embodiments, and may be configured to perform the procedures and/or the steps corresponding to the second terminal device in the method embodiments. To avoid repetition, details are not described herein again.

The apparatus 700 in each of the foregoing solutions has a function of implementing the corresponding steps performed by the first terminal device in the foregoing method, or the apparatus 700 in each of the foregoing solutions has a function of implementing the corresponding steps performed by the second terminal device in the foregoing method. The function may be implemented by hardware, or may be implemented by hardware executing corresponding software. The hardware or software includes one or more modules corresponding to the foregoing function. For example, a transceiver unit may be replaced with a transceiver (for example, a sending unit in the transceiver unit may be replaced with a transmitter, and a receiving unit in the transceiver unit may be replaced with a receiver), and another unit such as a processing unit may be replaced with a processor, to separately perform sending and receiving operations and a related processing operation in the method embodiments.

In addition, the transceiver unit 710 may alternatively be a transceiver circuit (for example, may include a receiver circuit and a transmitter circuit), and the processing unit may be a processing circuit.

It should be noted that the apparatus in FIG. 7 may be the network element or the device in the foregoing embodiments, or may be a chip or a chip system, for example, a system on chip (SoC). The transceiver unit may be an input/output circuit or a communication interface. The processing unit is a processor, a microprocessor, or an integrated circuit integrated on the chip. This is not limited herein.

As shown in FIG. 8, an embodiment of this application provides another communication mode switching apparatus 800. The apparatus 800 includes a processor 810. The processor 810 is coupled to a memory 820. The memory 820 is configured to store a computer program or instructions and/or data. The processor 810 is configured to execute the computer program or the instructions stored in the memory 820, or read the data stored in the memory 820, to perform the methods in the method embodiments.

Optionally, there are one or more processors 810.

Optionally, there are one or more memories 820.

Optionally, the memory 820 and the processor 810 are integrated together, or are separately disposed.

Optionally, as shown in FIG. 8, the apparatus 800 further includes a transceiver 830. The transceiver 830 is configured to receive and/or send signals. For example, the processor 810 is configured to control the transceiver 830 to receive and/or send signals.

In a solution, the apparatus 800 is configured to implement operations performed by the terminal device in the method embodiments.

For example, the processor 810 is configured to execute the computer program or the instructions stored in the memory 820, to implement related operations of the first terminal device in the method embodiments, for example, the method performed by the first terminal device in the embodiment shown in FIG. 3, or the method performed by the UE 1 in any embodiment shown in FIG. 4 to FIG. 6.

For another example, the processor 810 is configured to execute the computer program or the instructions stored in the memory 820, to implement related operations of the second terminal device in the method embodiments, for example, the method performed by the second terminal device in the embodiment shown in FIG. 3, or the method performed by the UE 2 in any embodiment shown in FIG. 4 to FIG. 6.

It should be understood that, the processor in this embodiment of this application may be a central processing unit (CPU), or may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor, or the like.

It should be further understood that the memory mentioned in this embodiment of this application may be a volatile memory and/or a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM may be used as an external cache. By way of example rather than limitation, the RAM includes the following plurality of forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus dynamic random access memory (direct rambus RAM, DR RAM).

It should be noted that when the processor is a general-purpose processor, a DSP, an ASIC, an FPGA, another programmable logic device, a discrete gate or transistor logic device, or a discrete hardware component, the memory (storage module) may be integrated into the processor.

It should further be noted that the memory described in this specification aims to include but is not limited to these memories and any memory of another suitable type.

As shown in FIG. 9, an embodiment of this application provides a chip system 900. The chip system 900 (or may be referred to as a processing system) includes a logic circuit 910 and an input/output interface (input/output interface) 920.

The logic circuit 910 may be a processing circuit in the chip system 900. The logic circuit 910 may be coupled to a storage unit, and invoke instructions in the storage unit, so that the chip system 900 can implement the methods and functions in embodiments of this application. The input/output interface 920 may be an input/output circuit in the chip system 900, and outputs information processed by the chip system 900, or inputs to-be-processed data or signaling information to the chip system 900 for processing.

Specifically, for example, if the chip system 900 is installed on the first terminal device, the logic circuit 910 is coupled to the input/output interface 920, and the logic circuit 910 may send a first message to the second terminal device through the input/output interface 920, where the first message may be a first message generated by the logic circuit 910 based on first reference information; or the input/output interface 920 may input a second message from the second terminal device to the logic circuit 910 for processing. For another example, if the chip system 900 is installed on the second terminal device, the logic circuit 910 is coupled to the input/output interface 920, and the logic circuit 910 may send a second message to the first terminal device through the input/output interface 920, where the second message may be a second message generated by the logic circuit 910 based on second reference information; or the input/output interface 920 may input a first message from the first terminal device to the logic circuit 910 for processing.

In a solution, the chip system 900 is configured to implement operations performed by the terminal device in the method embodiments.

For example, the logic circuit 910 is configured to implement a processing-related operation performed by the first terminal device in the method embodiments, for example, a processing-related operation performed by the first terminal device in the embodiment shown in FIG. 3, or a processing-related operation performed by the UE 1 in any embodiment shown in FIG. 4 to FIG. 6. The input/output interface 920 is configured to implement a sending and/or receiving-related operation performed by the first terminal device in the method embodiments, for example, a sending and/or receiving-related operation performed by the first terminal device in the embodiment shown in FIG. 3, or a sending and/or receiving-related operation performed by the UE 1 in any embodiment shown in FIG. 4 to FIG. 6.

For another example, the logic circuit 910 is configured to implement a processing-related operation performed by the second terminal device in the method embodiments, for example, a processing-related operation performed by the second terminal device in the embodiment shown in FIG. 3, or a processing-related operation performed by the UE 2 in any embodiment shown in FIG. 4 to FIG. 6. The input/output interface 920 is configured to implement a sending and/or receiving-related operation performed by the second terminal device in the method embodiments, for example, a sending and/or receiving-related operation performed by the second terminal device in the embodiment shown in FIG. 3, or a sending and/or receiving-related operation performed by the UE 2 in any embodiment shown in FIG. 4 to FIG. 6.

An embodiment of this application further provides a computer-readable storage medium. The computer-readable storage medium stores computer instructions used to implement the method performed by the first terminal device or the second terminal device in the method embodiments.

For example, when the computer instructions are executed by a computer, the computer is enabled to implement the method performed by the first terminal device in the method embodiments.

An embodiment of this application further provides a computer program product, including instructions. When the instructions are executed by a computer, the method performed by the first terminal device or the second terminal device in the method embodiments is implemented.

An embodiment of this application further provides a communication system. The communication system includes the first terminal device and the second terminal device in the foregoing embodiments. For example, the system includes the first terminal device and the second terminal device in the embodiment shown in FIG. 3.

For explanations and beneficial effects of related content of any one of the apparatuses provided above, refer to the corresponding method embodiment provided above. Details are not described herein again.

In the several embodiments provided in this application, it should be understood that the disclosed apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings, direct couplings, or communication connections may be implemented through some interfaces. Indirect couplings or communication connections between the apparatuses or units may be implemented in an electronic form, a mechanical form, or another form.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication mode switching method, comprising:

sending, by a first terminal device, a first message to a second terminal device, wherein the first message requests to switch at least one service between the first terminal device and the second terminal device from a proximity-based services communication 5 (PC5) interface communication mode to a Uu interface communication mode; and receiving, by the first terminal device, a second message responsive to the first message from the second terminal device, wherein the second message notifies that switching of a first service from the PC5 interface communication mode to the Uu interface communication mode is accepted, and the at least one service comprises the first service, wherein the method further comprises:

determining, by the first terminal device, a second quality of service (QoS) parameter based on a third QoS parameter, wherein the third QoS parameter is used by the first terminal device to transmit data of the first service in the PC5 interface communication mode; and sending, by the first terminal device to the second terminal device, the second QoS parameter to be used by the second terminal device to transmit data of the first service in the Uu interface communication mode.

2. The method according to claim 1, wherein the second message carries identification information of the first service.

3. The method according to claim 1, wherein the first message carries identification information of the at least one service.

4. The method according to claim 1, wherein the first message is a path switch request message.

5. The method according to claim 1, wherein the sending, by the first terminal device, the first message to the second terminal device comprises:

sending, by the first terminal device, the first message to the second terminal device based on first reference information, wherein the first reference information comprises at least one of: a path selection policy, a path switching policy, a quality of service (QoS) requirement of a PC5 QoS flow corresponding to the at least one service, or signal quality of transmitting data of the at least one service by the first terminal device in the PC5 interface communication mode.

6. The method according to claim 5, wherein the sending, by the first terminal device, the first message to the second terminal device based on the first reference information comprises:

in response to the signal quality of transmitting the data of the at least one service by the first terminal device in the PC5 interface communication mode being less than a first signal quality threshold, sending, by the first terminal device, the first message to the second terminal device.

7. The method according to claim 1, wherein the method further comprises:

determining, by the first terminal device, a first QoS parameter based on the third QoS parameter, wherein the first QoS parameter is to be used by the first terminal device to transmit data of the first service in the Uu interface communication mode.

8. The method according to claim 1, wherein the first message carries the second QoS parameter to be used by the second terminal device to transmit data of the first service in the Uu interface communication mode.

9. The method according to claim 1, wherein the method further comprises:

sending, by the first terminal device to the second terminal device, address information of the first terminal device to be used to transmit data of the first service between the first terminal device and the second terminal device in the Uu interface communication mode; and receiving, by the first terminal device from the second terminal device, address information of the second terminal device to be used to transmit data of the first service between the first terminal device and the second terminal device in the Uu interface communication mode.

10. The method according to claim 1, wherein the first message carries an identifier of a PC5 QoS flow corresponding to the at least one service requested to be switched from the PC5 interface communication mode to the Uu interface communication mode.

11. A communication mode switching method, comprising:

receiving, by a second terminal device, a first message from a first terminal device, wherein the first message requests to switch at least one service between the first terminal device and the second terminal device from a proximity-based services communication 5 (PC5) interface communication mode to a Uu interface communication mode; and sending, by the second terminal device and in response to the first message, a second message to the first terminal device, wherein the second message notifies that switching of a first service from the PC5 interface communication mode to the Uu interface communication mode is accepted, and the at least one service comprises the first service, wherein the method further comprises:

receiving, by the second terminal device from the first terminal device, a second quality of service (QoS) parameter to be used by the second terminal device to transmit data of the first service in the Uu interface communication mode, wherein the second QoS parameter is determined by the first terminal device based on a third QoS parameter used by the first terminal device to transmit data of the first service in the PC5 interface communication mode.

12. The method according to claim 11, wherein the first message carries an identifier of a PC5 QoS flow corresponding to the at least one service requested to be switched from the PC5 interface communication mode to the Uu interface communication mode.

13. A communication mode switching apparatus, comprising:

at least one processor coupled with a non-transitory storage medium storing executable instructions which are executable by the at least one processor to cause the apparatus to:

send a first message to a second terminal device, wherein the first message requests to switch at least one service between the apparatus and the second terminal device from a proximity-based services communication 5 (PC5) interface communication mode to a Uu interface communication mode; and receive a second message responsive to the first message from the second terminal device, wherein the second message notifies that switching of a first service from the PC5 interface communication mode to the Uu interface communication mode is accepted, and the at least one service comprises the first service, wherein the instructions are executable by the at least one processor to further cause the apparatus to:

determine a second quality of service (QoS) parameter based on a third QoS parameter, wherein the third QoS parameter is used by the apparatus to transmit data of the first service in the PC5 interface communication mode; and send, to the second terminal device, the second QoS parameter to be used by the second terminal device to transmit data of the first service in the Uu interface communication mode.

14. The apparatus according to claim 13, wherein the instructions are executable by the at least one processor to cause the apparatus to:

send the first message to the second terminal device based on first reference information, wherein the first reference information comprises at least one of: a path selection policy, a path switching policy, a quality of service (QoS) requirement of a PC5 QoS flow corresponding to the at least one service, or signal quality of transmitting data of the at least one service by the apparatus in the PC5 interface communication mode.

15. The apparatus according to claim 14, wherein the instructions are executable by the at least one processor to cause the apparatus to:

in response to the signal quality of transmitting the data of the at least one service by the apparatus in the PC5 interface communication mode being less than a first signal quality threshold, send the first message to the second terminal device.

16. The apparatus according to claim 13, wherein the instructions are executable by the at least one processor to further cause the apparatus to:

determine a first QoS parameter based on the third QoS parameter, wherein the first QoS parameter is to be used by the apparatus to transmit data of the first service in the Uu interface communication mode.

17. The apparatus according to claim 13, wherein the first message carries an identifier of a PC5 QoS flow corresponding to the at least one service requested to be switched from the PC5 interface communication mode to the Uu interface communication mode.

18. A communication mode switching apparatus, comprising:

at least one processor coupled with a non-transitory storage medium storing executable instructions which are executable by the at least one processor to cause the apparatus to:

receive a first message from a first terminal device, wherein the first message requests to switch at least one service between the first terminal device and the apparatus from a proximity-based services communication 5 (PC5) interface communication mode to a Uu interface communication mode; and in response to the first message, send a second message to the first terminal device, wherein the second message notifies that switching of a first service from the PC5 interface communication mode to the Uu interface communication mode is accepted, and the at least one service comprises the first service, wherein the instructions are executable by the at least one processor to further cause the apparatus to:

receive, from the first terminal device, a second quality of service (QoS) parameter to be used by the apparatus to transmit data of the first service in the Uu interface communication mode, wherein the second QoS parameter is determined by the first terminal device based on a third QoS parameter used by the first terminal device to transmit data of the first service in the PC5 interface communication mode.

19. The apparatus according to claim 18, wherein the first message carries an identifier of a PC5 QoS flow corresponding to the at least one service requested to be switched from the PC5 interface communication mode to the Uu interface communication mode.

* * * * *